J. A. KEYES.
CAB FARE REGISTER.
APPLICATION FILED JULY 7, 1899.
1,036,259.
Patented Aug. 20, 1912.
13 SHEETS—SHEET 2.
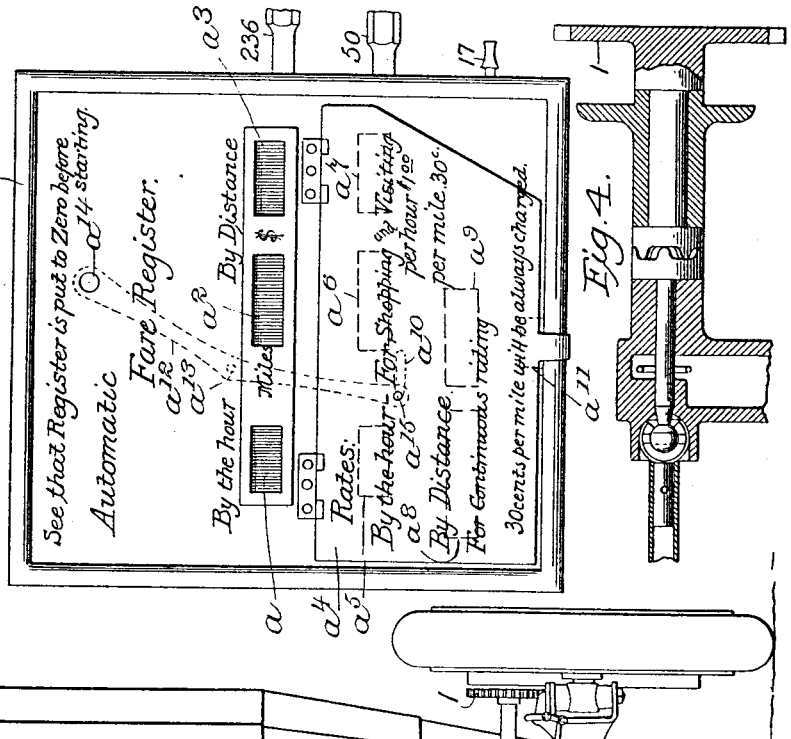
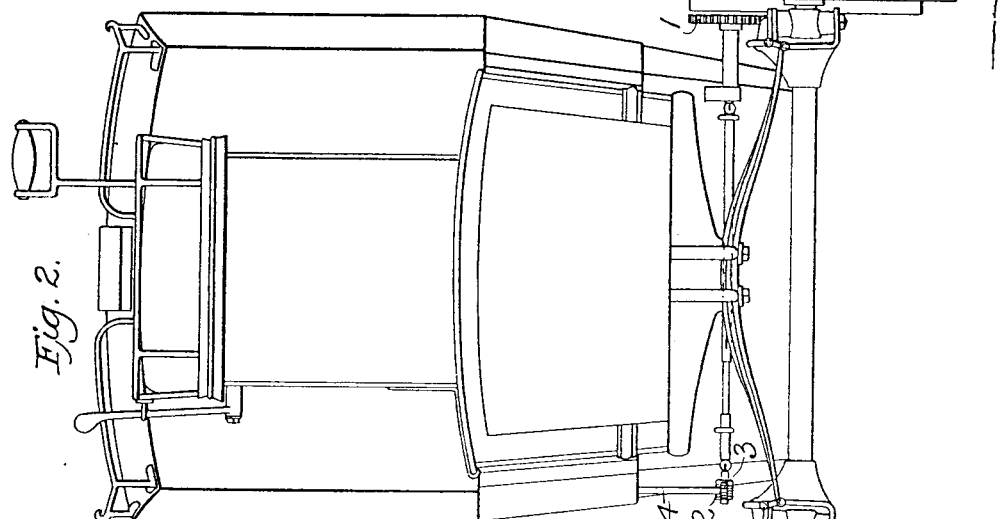

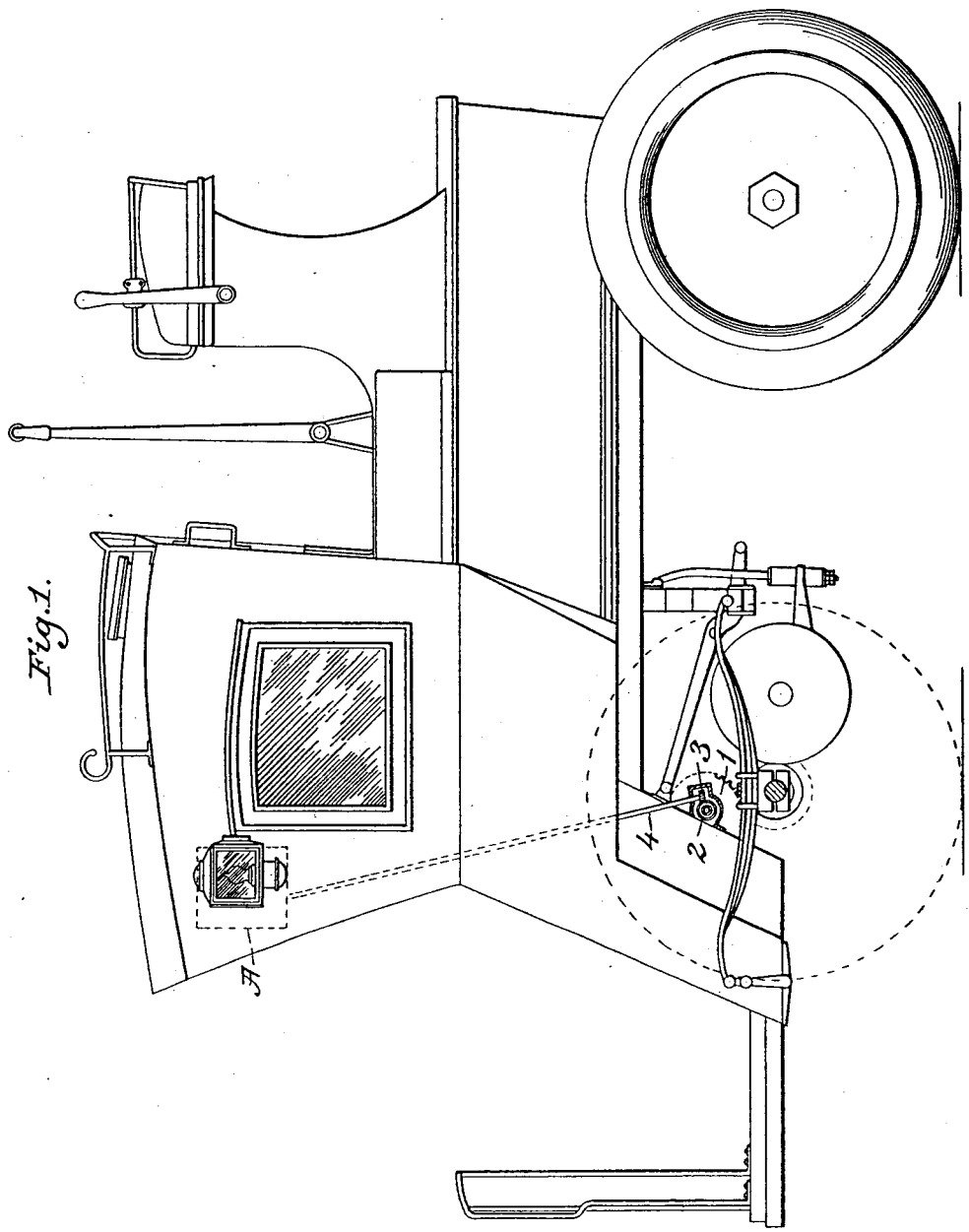

J. A. KEYES.
CAB FARE REGISTER.
APPLICATION FILED JULY 7, 1899.
1,036,259.
Patented Aug. 20, 1912.
13 SHEETS—SHEET 3.
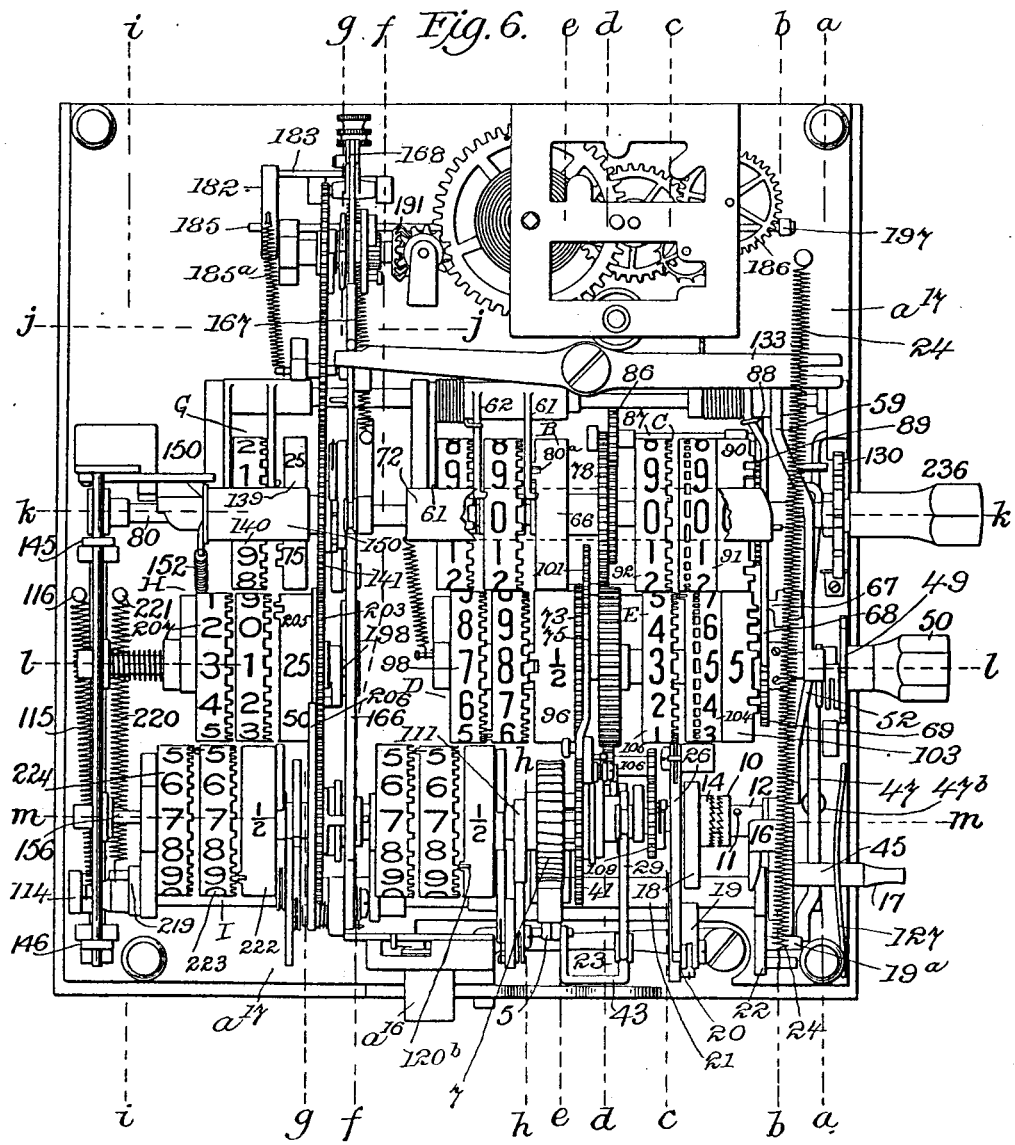

J. A. KEYES.
CAB FARE REGISTER.
APPLICATION FILED JULY 7, 1899.
1,036,259.
Patented Aug. 20, 1912.
13 SHEETS—SHEET 4.
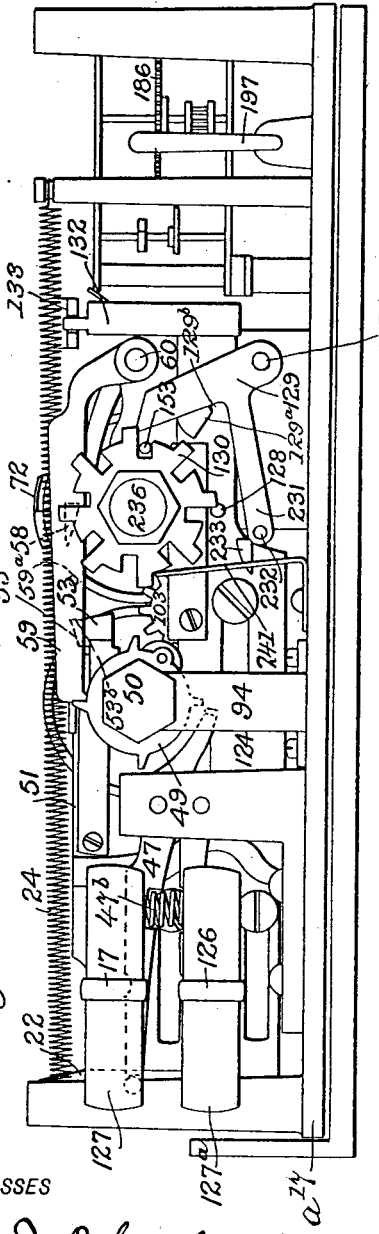
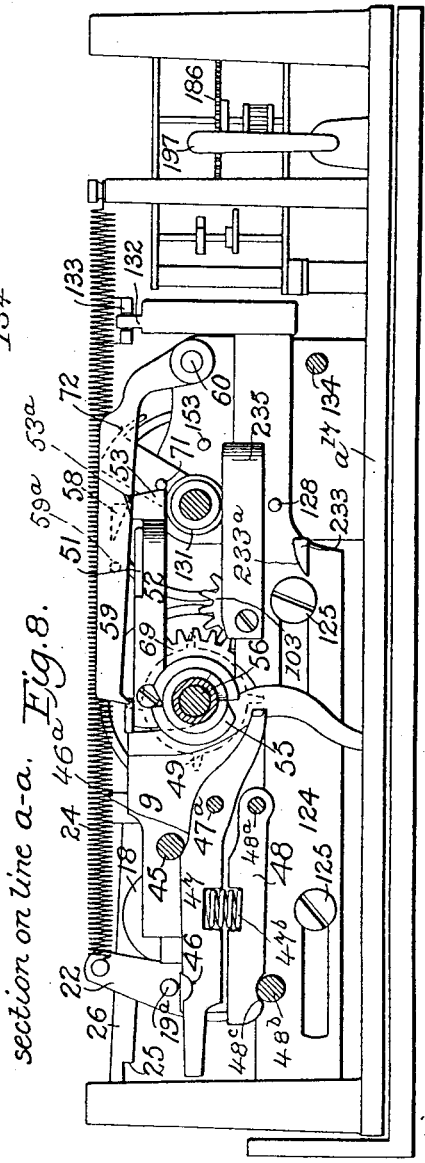

J. A. KEYES.
CAB FARE REGISTER.
APPLICATION FILED JULY 7, 1899.
1,036,259.
Patented Aug. 20, 1912.
13 SHEETS—SHEET 5.
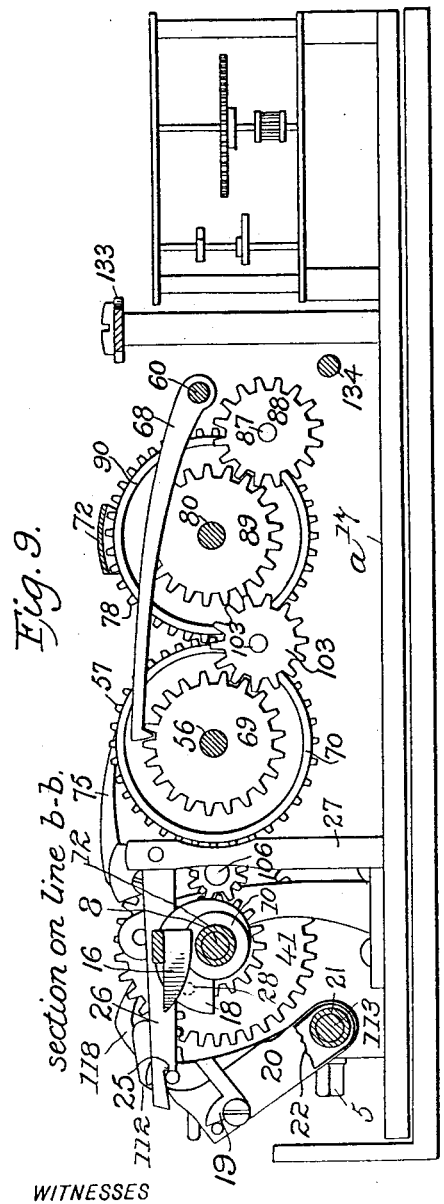
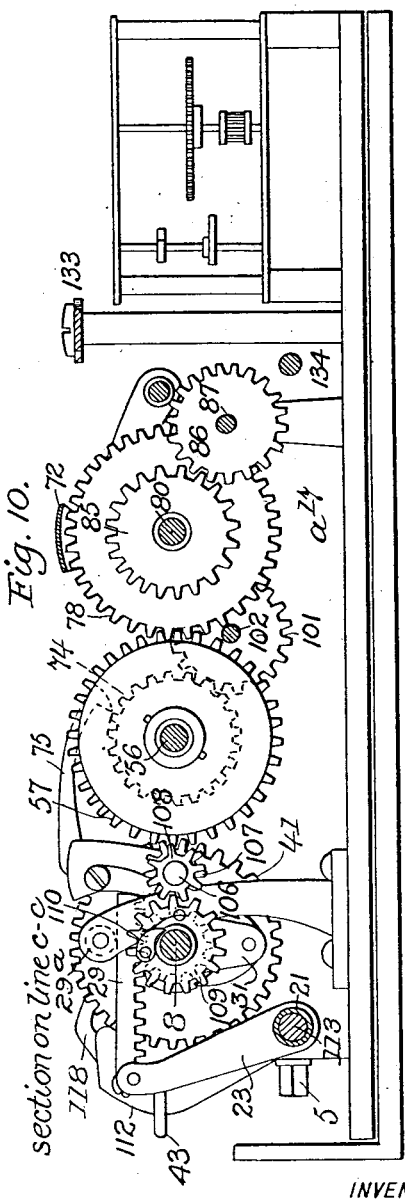

J. A. KEYES.
CAB FARE REGISTER.
APPLICATION FILED JULY 7, 1899.
1,036,259.
Patented Aug. 20, 1912.
13 SHEETS—SHEET 6.
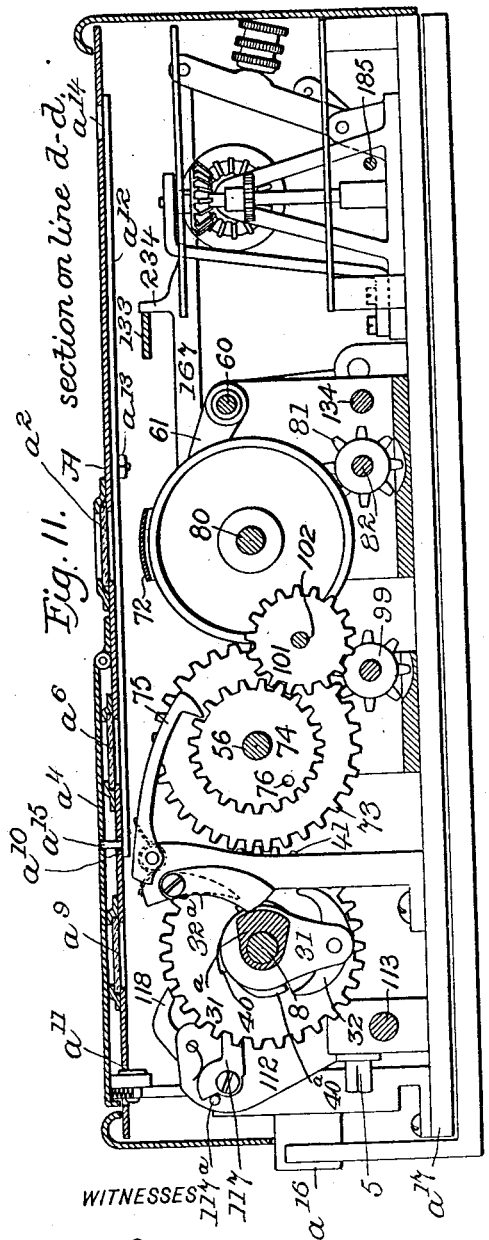
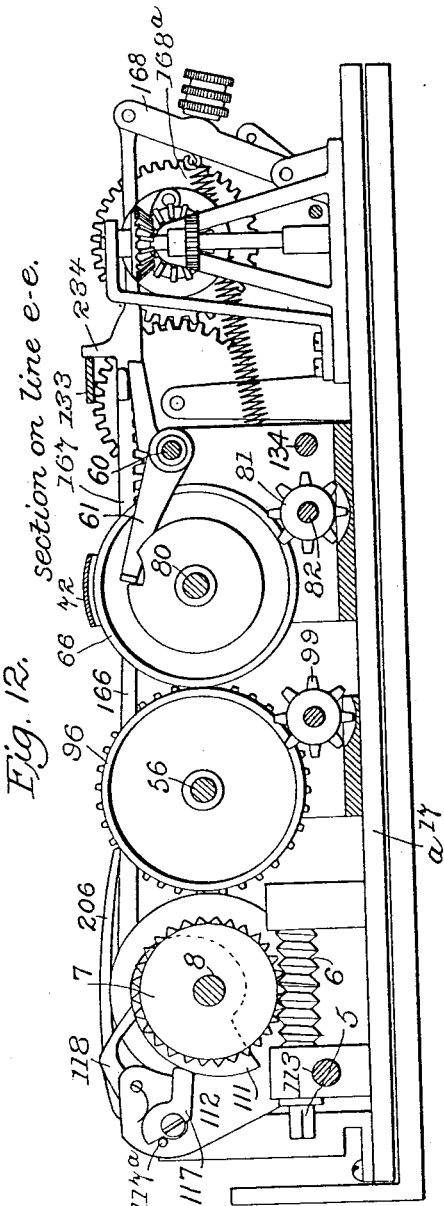
WITNESSES
INVENTOR
BY
ATTORNEY J. A. KEYES.
CAB FARE REGISTER.
APPLICATION FILED JULY 7, 1899.
1,036,259.
Patented Aug. 20, 1912.
13 SHEETS—SHEET 7.
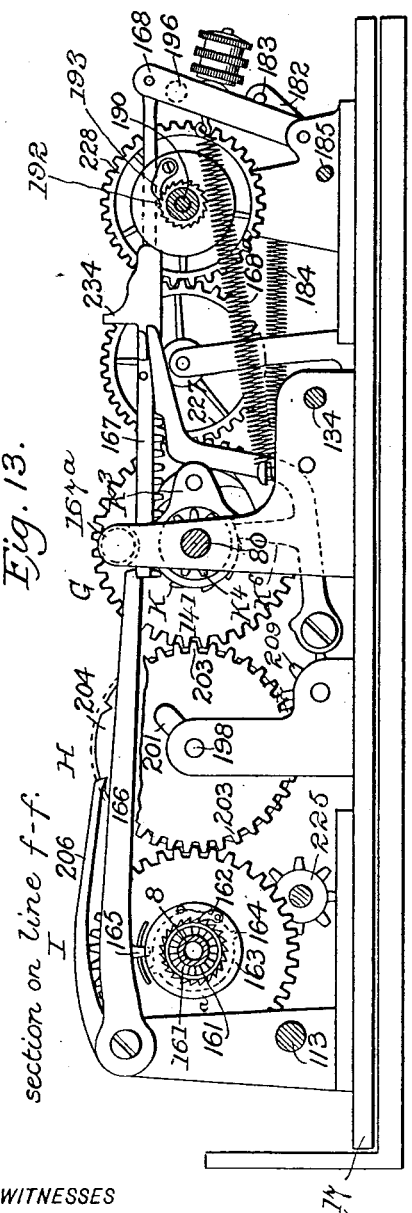
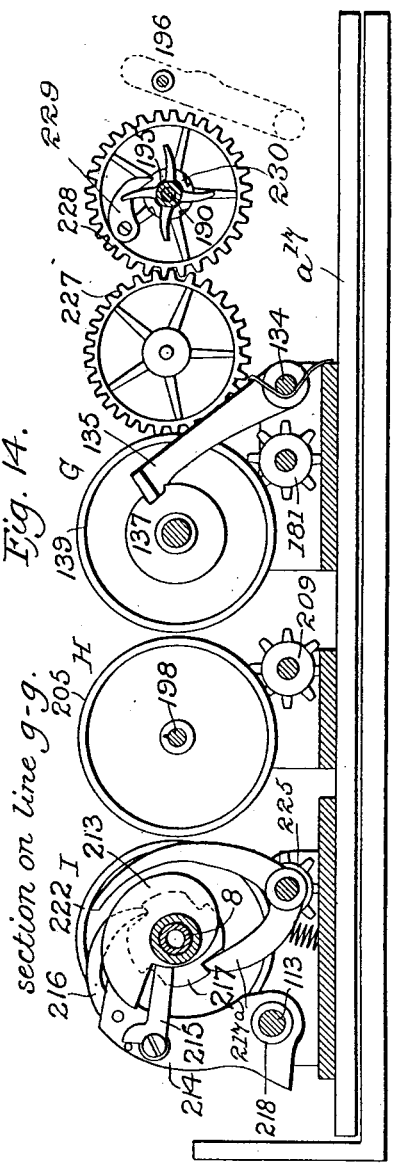

J. A. KEYES.
CAB FARE REGISTER.
APPLICATION FILED JULY 7, 1899.
1,036,259.
Patented Aug. 20, 1912.
13 SHEETS—SHEET 8.
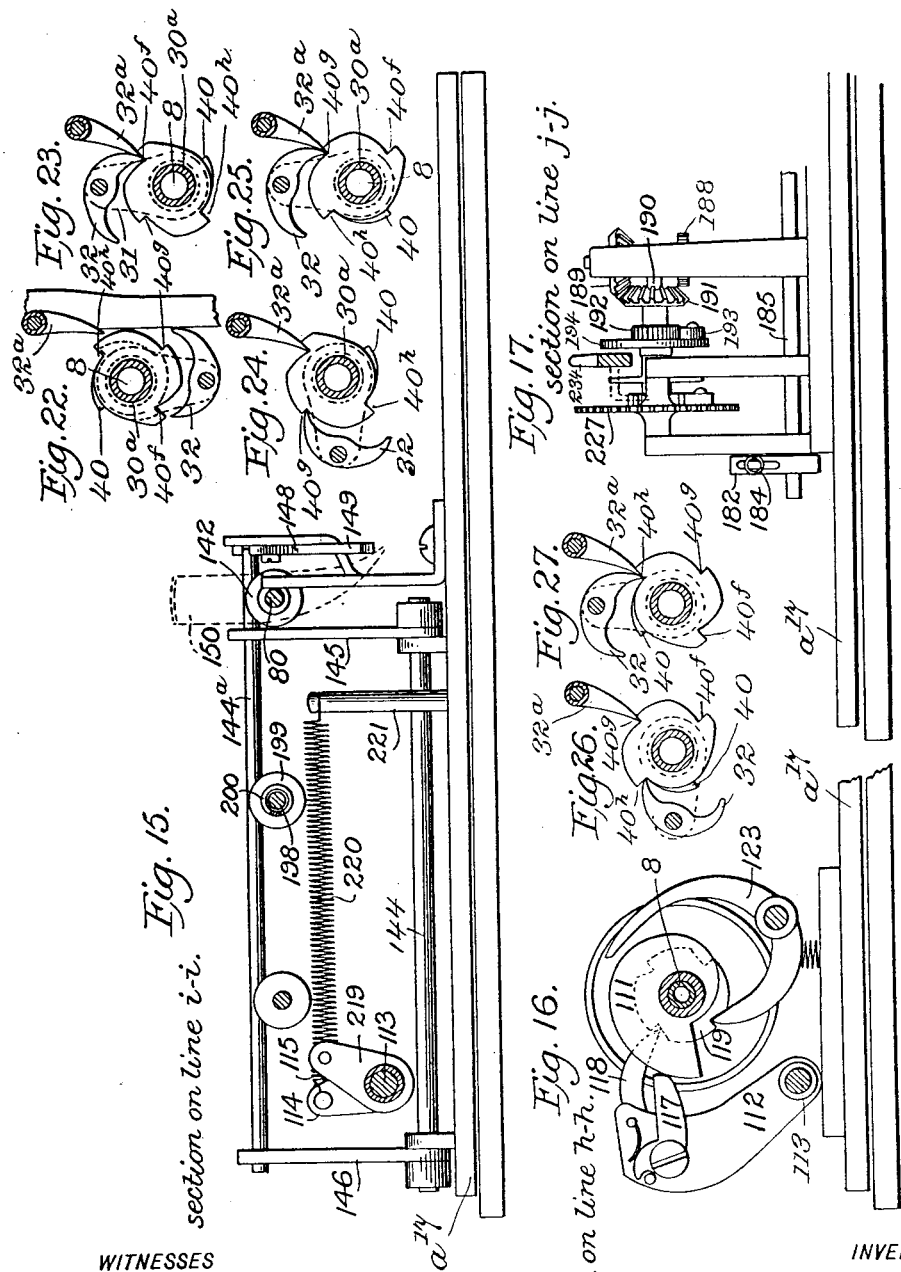

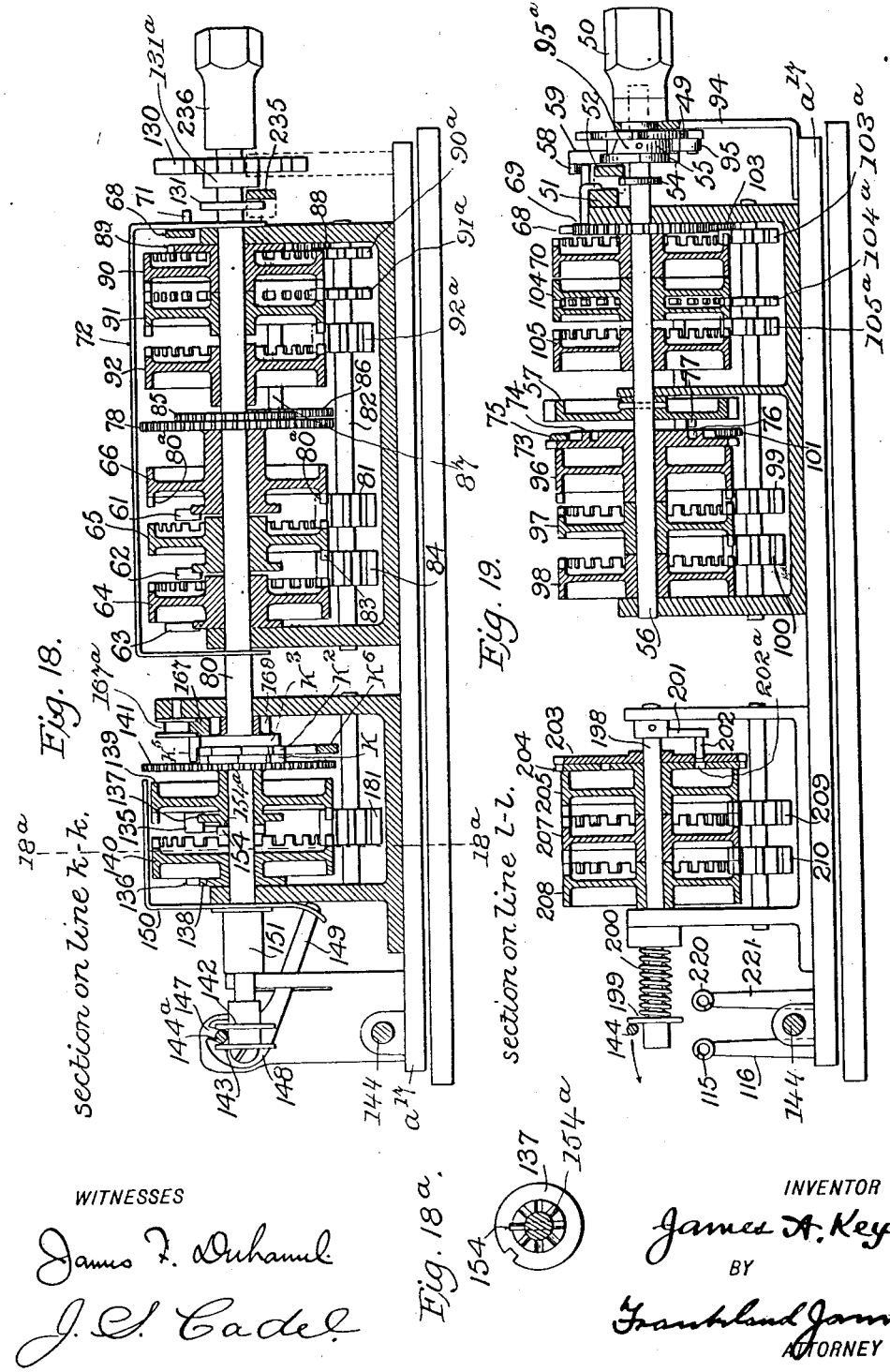

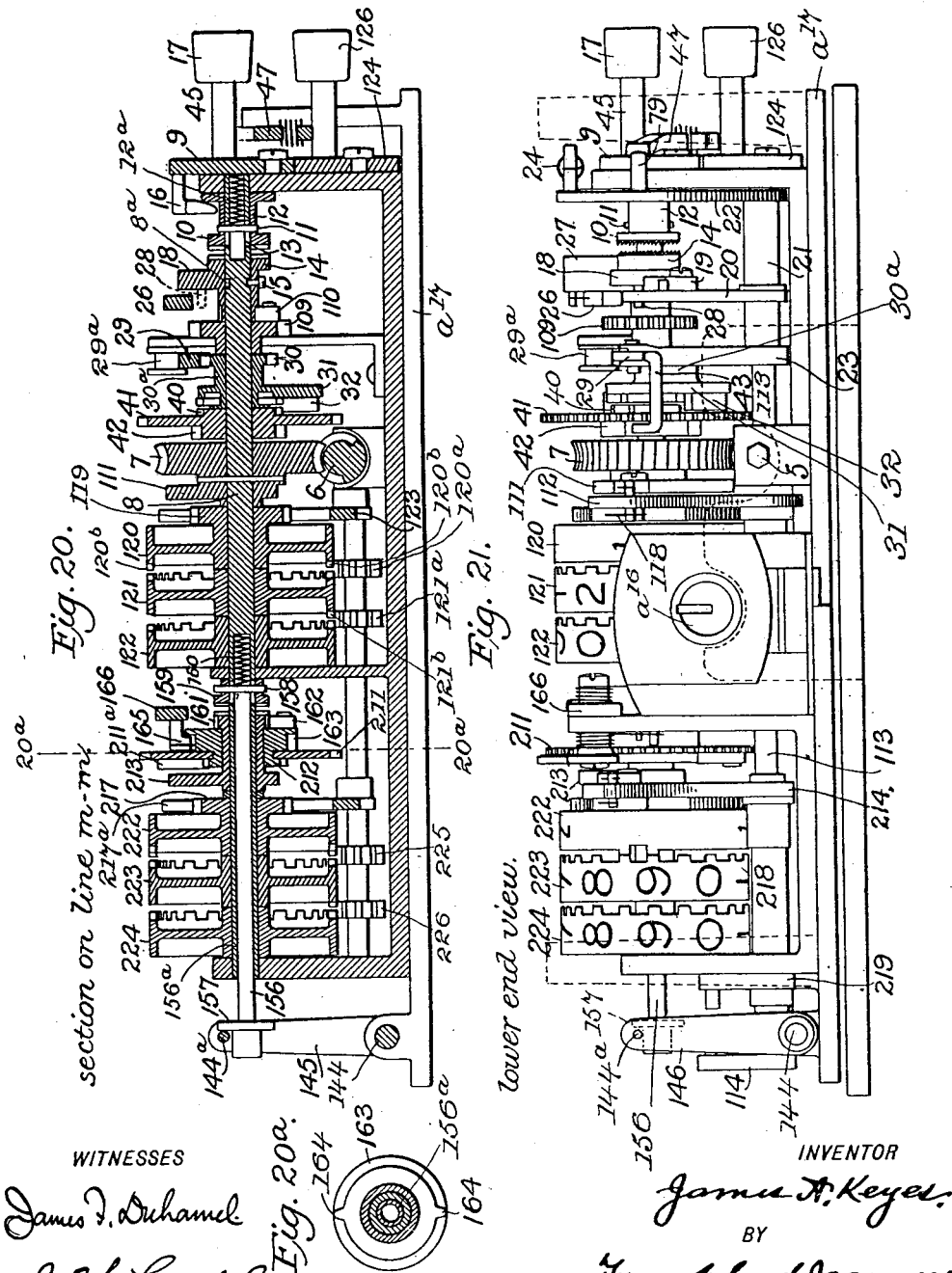

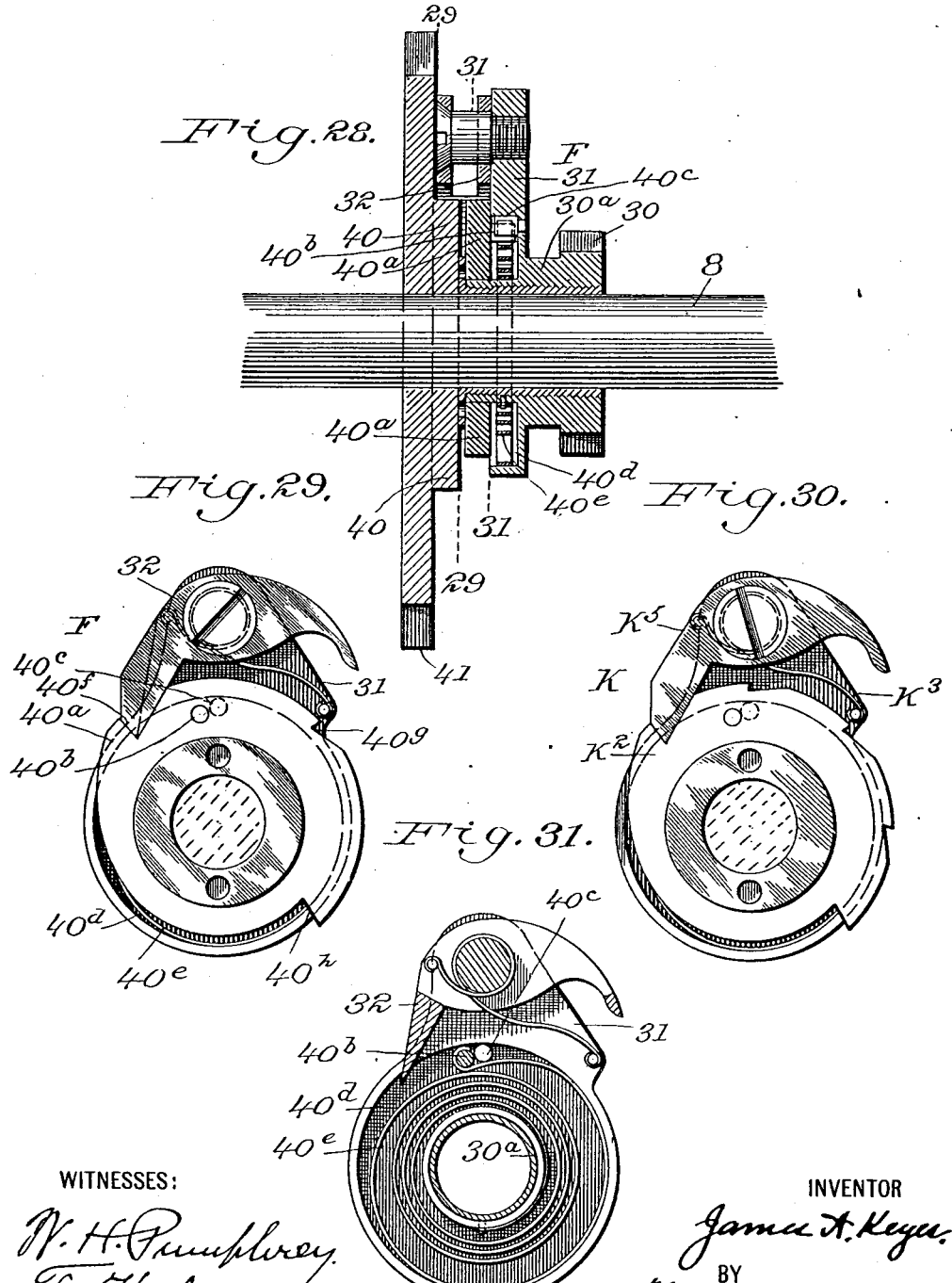

J. A. KEYES.
CAB FARE REGISTER.
APPLICATION FILED JULY 7, 1899.
1,036,259.
Patented Aug. 20, 1912.
13 SHEETS—SHEET 12.
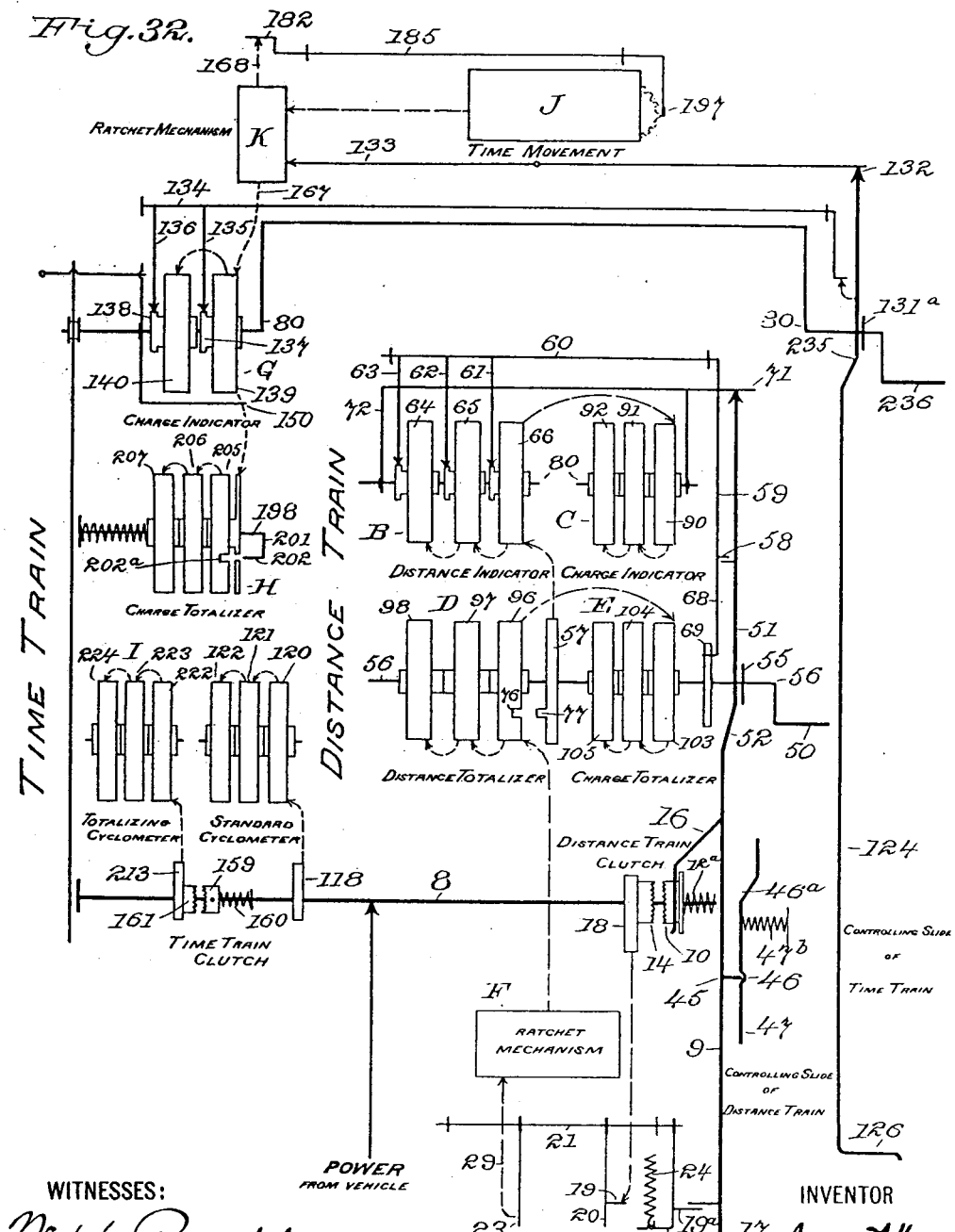

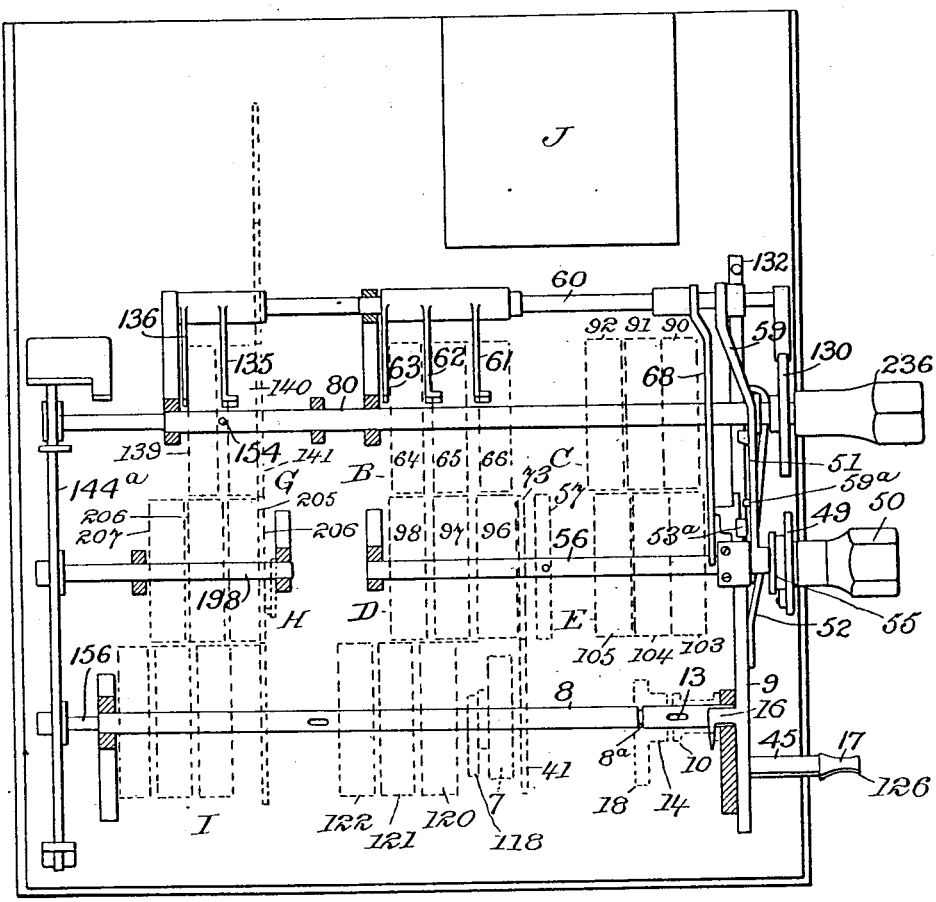

UNITED STATES PATENT OFFICE.

JAMES ALEXANDER KEYES, OF NEW YORK, N. Y., ASSIGNOR, BY MESNE ASSIGNMENTS, TO THE COLUMBIA MOTOR CAR COMPANY, OF HARTFORD, CONNECTICUT, A CORPORATION OF CONNECTICUT.

CAB-FARE REGISTER.

1,036,259.      Specification of Letters Patent.    Patented Aug. 20, 1912.

Application filed July 7, 1899. Serial No. 723,015.

*To all whom it may concern:*

Be it known that I, JAMES ALEXANDER KEYES, a citizen of the United States of America, and resident of the city of New York, county of New York, and State of New York, have invented certain new and useful Improvements in Cab-Fare Registers, of which the following is a specification.

This invention relates to apparatus or devices to be used in connection with vehicles or other conveyances to indicate certain functions in the operation of the conveyance or the results of such function or operation of the conveyance.

The more particular object of the apparatus in the particular class of which one sample is herein illustrated and described, is to indicate or register on any vehicles which are rented or hired, the amount to be paid for such renting or hire on such basis as may be determined.

An object of the apparatus is also to indicate, or to register for, the owner of a vehicle the operation or use of the vehicle on the part of the operator or driver.

Among the objects of this invention are a fare indicating apparatus which at all times shall show the amount to be paid by a passenger for the use of the vehicle; a distinct visible indication of the figure representing the sum to be paid at any time that a person hiring the vehicle desires to leave it; the full amount of fares which have been paid by different passengers to the driver or operator during the entire period intervening between the times of inspection; the indication or registering of a definite minimum charge for the use of the vehicle and the proper coöperation of the apparatus regarding unit, time or distance charges with the initial charge arrangement; the indication in the full sight of user of the vehicle and otherwise evident display for the purpose of avoiding dispute between driver and user; complete interlocking or locking to insure protection of register of operation for the owner of the vehicle as well as for the operator and for the user or either of them, and various other objects for the purpose of safeguarding the owner of the vehicle as well as the user of the vehicle, that is the public as well as the driver or operator thereof.

More particularly the purpose of the apparatus herein shown and described is to accomplish some or all of the objects above stated in a single mechanism, which can be readily set to indicate the amount that should be paid by the user of the vehicle in accordance with a legal or prescribed and fixed tariff either by the distance traveled or by the time the vehicle is used, and involving means whereby either method of charge may be readily employed at the option of the passenger; also to insure the private registering for the owner of the vehicle of the extent of operation by the driver and the amount collected by the driver from the passengers, whether by time charge or distance charge, as well as to insure the returns to the owner for all the revenue bearing use of the vehicle, as well as the "dead" mileage or non-revenue bearing time of operation of the vehicle.

A further purpose is to in every respect suit the requirements of the passenger so far as his preference is concerned as to paying for the time he occupies the vehicle or the distance he travels with the vehicle and to permit ready change of charge method if desired without waste of time or difficulty or chance of loss by owner, operator or passenger.

Whereas in the past it has been attempted to provide fare registering apparatuses sometimes known as taximeters, to accomplish some of the purposes above indicated, they have one or all involved difficulties or objections owing to inconvenience in setting, non reliability in operation, or cost. But in most cases they have also not offered the facilities required by the public in the use of vehicles for hire, among other ways in that a passenger desires to select for himself whether he pays by the distance or pays by the time the vehicle is used. In addition registers or taximeters heretofore suggested involved methods of operation whereby the passenger could impose upon the driver or the driver could impose upon the owner or the passenger. By my invention I have succeeded in overcoming all of the above difficulties and in fact any and all difficulties which may be reasonably anticipated in fare registers of this character.

Forming part of this specification I have illustrated a fare register embodying my inventions and combinations, but the inventions sought to be covered hereby are more specifically set forth in the claims annexed hereto and forming a part hereof.

The form I have shown and described is a taximeter or cab fare register of compact form which can be conveniently installed in a vehicle for hire and which can be readily set when a passenger hires the vehicle, to indicate upon operation, what he must pay for the hire on the basis of either distance traveled or time used. Time indicating means controls the apparatus in part while connections with the moving parts of the vehicle control the other parts of the apparatus. A portion of the registering mechanism is inaccessible to the driver and only accessible to the owner or inspector representing the owner of the vehicles. Furthermore, though the passenger may have entered the vehicle and moved a short distance and changes his mind or desires to change the system on which he wishes to pay for the hire of the vehicle, this apparatus permits him to do so without charging the mistake to the driver. The two systems of registration are so connected and interconnected that neither of them can be used without the other being disengaged and the two systems so far as the passenger is concerned, rendered wholly independent. Accordingly the distance registering apparatus is uncoupled from the main shaft when the time actuating train is connected to the main shaft. The uncoupling of the distance train with its indicating and registering drums is accomplished by the uncoupling of a clutch which operates the same from the main shaft. And with this is effected the coupling of a second clutch upon the main shaft with the time train. The main shaft carries two cyclometer trains, one of which is directly connected so as to register at all times, the second is connected to operate when the time train is coupled with the main shaft when it operates in unison with the main cyclometer. The time train includes clock or time recording movements for actuating the train at a known rate.

A pair of drums are adapted to the time mechanism and moved in proximity to an opening in the face of the fare register to indicate by figures on their surface the amount due, while a screen connected with interlocking mechanism is arranged to show or to conceal the figures on the time mechanism drums. A second set of dial drums actuated by the first are for adding and totalizing the indicated earnings on the time plan, while lastly the auxiliary cyclometer shows to the inspector the extent of use, that is the distance traveled by the vehicle when the passengers have been charged on the time basis. Similar openings in the face of the fare register permit the passenger to see the figures on indicating and registering drums actuated by the distance train while shutters obscure such figures when the distance charge basis is not the one elected by the passenger. Totalizing or adding drums indicate to the inspector upon his opening the apparatus the earnings of the vehicle when it has been operated on the distance charge basis. While finally the entire operation of the vehicle as to distance traveled is indicated by the main cyclometer. In addition an indicating signal is displayed when the taximeter has not been set for registering charge either by distance or time, which shows the public that the vehicle is for hire. This also shows to the owners of the vehicle that no charge is being recorded and inspectors or the owner of the vehicle thereby checks the driver because the latter cannot run his vehicle with a passenger in it without avoiding detection.

In order that a minimum charge is indicated to the passenger should he use the vehicle for less than the fixed unit of distance the mechanism is so arranged that if the unit of charge is for each half mile, and the least charge is equivalent to the regular rate for one mile, the registering drums will indicate the minimum amount after the vehicle has gone a short distance. Similarly should the passenger elect to pay on the time charge basis, the apparatus being set for time charge, it becomes operative, by special mechanism, only after the vehicle has traveled a short distance and then registers the minimum time charge after which the time charge mechanism proceeds to register by the smaller units until such time as the settlement is made by the passenger. When the passengers alight and settle either by time or distance of charge, the driver sets the passenger register back to zero, whereupon the registrations open only to the examination of the inspector or owner have become totalized indicating the entire amount the driver has received from the passengers since the previous inspection and setting of the totalizing mechanism.

It will be seen that in registering the minimum charge of a larger amount than the subsequent units of charge, the apparatus automatically changes from abnormal to normal. A feature of importance is found in a locking device for the distance train, which when the apparatus is set at zero holds the actuating mechanism thereof in such a position that when released it will move two units instead of one and that will not interfere with the same train operating by single units, as for instance, half miles thereafter. It will also be seen that if the passenger leaves the vehicle when he has traveled a little over 1½ miles, the fare indicating drums will have been actuated to show a charge for two miles, but should the trip be continued no increased charge will be registered until the vehicle has traversed the full two miles. The parts and connections by which this result is obtained I term "Advance payment mechanism."

The mechanism by which these various registrations are produced will be hereinafter fully described in connection with the accompanying drawings, and referred to in the appended claims.

Similar figures of reference indicate like parts throughout the several views of which—

Figure 1 illustrates by a view in side elevation, the application of the taximeter to a motor vehicle. Fig. 2 is a view of the same in rear elevation, illustrating an arrangement of gearing from the vehicle axle to the taximeter. Fig. 3 is a face view of the taximeter. Fig. 4 is an enlarged sectional view in detail, of a portion of the gearing shown in Fig. 2. Fig. 5 is a similar view of another portion of the gearing. Fig. 6 is a general plan view of the assembled mechanism of the taximeter with the casing removed to more clearly illustrate the same. Fig. 6ª is a face view of the casing, with the lettering etc. omitted. Fig. 7 is an elevation of the taximeter as it appears when viewed from the right hand side of Fig. 6. Fig. 8 is a view in longitudinal section, taken on the line $a, a,$ of Fig. 6. Fig. 9 is a view in longitudinal section taken on the line $b, b,$ of Fig. 6, with the upper portion of the rocker arm 22 shown broken away. Fig. 10 is a view in longitudinal section taken on the line $c, c,$ of Fig. 6. Fig. 11 is a view in longitudinal section taken on the line $d, d,$ of Fig. 6. Fig. 12 is a view in longitudinal section taken on the line $e, e,$ of Fig. 6. Fig. 13 is a view in longitudinal section, taken on the line $f, f,$ of Fig. 6. Fig. 14 is a view in longitudinal section, taken on the line $g, g,$ of Fig. 6. Fig. 15 is a view in longitudinal section taken on the line $i, i,$ of Fig. 6. Fig. 16 is a view in longitudinal section, taken on the line $h, h,$ of Fig. 6. Fig. 17 is a fragmentary view in transverse section taken on the line $j, j,$ of Fig. 6. Fig. 18 is a view in cross section taken on the line $k, k,$ of Fig. 6. Fig. 18ª is a sectional view in detail taken on the line 18ª of Fig. 18. Fig. 19 is a view in cross section taken on the line $l, l,$ of Fig. 6. Fig. 20 is a view in cross section taken on the line $m, m,$ of Fig. 6. Fig. 20ª is a detail sectional view, taken on the line 20ª of Fig. 20. Fig. 21 is a view in elevation of the lower end of the assembled mechanism illustrated in Fig. 6. Figs. 22, 23, 24, 25, 26 and 27 are views in detail illustrating successive steps in the operation of the feed pawl, etc., of the ratchet mechanism of the distance train. Fig. 28 is an enlarged detail sectional view of the distance train ratchet mechanism (Figs. 22—27). Fig. 29 is an enlarged sectional view taken on the line 29, 29 of Fig. 28. Fig. 30 is a similar view of the time train ratchet. Fig. 31 is a sectional view taken on the line 31, 31 of Fig. 28. Fig. 32 is a view in diagram of the mechanism shown in Fig. 6, and Fig. 33 is a similar view, showing the several shafts and the controlling slides.

The machine may be said to embody essentially two main trains of mechanism, one of which is geared to be driven from the axle or suitable revolving part of the vehicle and is therefore termed the distance train, while the other is operatively connected to be driven by a time movement, and is termed the time train. In addition to these trains of mechanism, a standard cyclometer is also employed, which being driven from the axle or other suitable part of the vehicle, serves to register the total distance covered by the vehicle. The operation of this cyclometer is continuous during the travel or while the vehicle is in motion and ceases when the vehicle is at rest; and it is not influenced nor does its action in any manner affect the operation, adjustment, etc., of the mechanism of either the time or distance train.

In deriving motion from separate sources, the distance and time trains are rendered independent of each other, except in that the adjustment necessary for setting one train in operation serves also to lock the other train and thereby prevents simultaneous action of both trains in the particular embodiment here shown.

The distance train comprises four devices; an indicating cyclometer, by means of which the distance traveled is visually indicated to the occupant of the vehicle; a totalizing cyclometer or permanent register, which serves to totalize the distances shown by the indicating cyclometer; a charge indicator, which after the first or minimum charge has been shown, operates in unison with the indicating cyclometer and visually represents to the passenger the amount due, in dollars and cents at any time according to distance traveled, and a charge totalizer or permanent register, which totalizes the amounts shown by the charge indicator. These devices above referred to may employ any number of suitable drums desired, but for practical purposes, three in each series are found sufficient and are provided with the ordinary peripheral markings, representing units or fractions thereof, tens, hundreds, etc., and each series of three drums are geared together in a manner well known in the art, to indicate addition up to a determined amount.

A drum of each series, that is to say, the four drums bearing characters of the lowest order, *i. e.*, units or fractions thereof, are operatively connected through suitable gearing to move simultaneously at a uniform speed and under each impluse from the driving gear proper, are caused to rotate a quarter revolution. This operation results in successive indications of half miles by the first right hand drum of the distance indicator and the resulting addition by the adjoining drums of higher order. Also in successive indications of 15 cents, by the coaction of the first and second drums of the charge indicator or of " 5." alternating with " 0 " by the first drums thereof and the resulting addition by the adjoining drums of higher order. These totals appear through sight openings or windows for the information of the passenger, advising him of the distance traveled and the proportionate charge—under distance rates.

Through the intermeshing gearing employed between the indicators and totalizers, the latter will be correspondingly advanced and maintained as suggested, by being positively locked against back play, or rotation, when the indicators are reversed, or set back to zero preparatory to the next trip or operation, and this is effected manually, by the motorman, when the passenger in arriving at his destination, leaves the vehicle.

The temporary disengagement of the totalizers from the indicators in permitting independent rotation of the indicators when the latter are being turned back to zero is provided for by an interposed clutch forming part of the driving gear.

The distance train when not in operation, is held against play or rotation in either direction by a system of locking pawls, controlled by a sliding bar or rod. These pawls engage notched hubs of the distance indicator drums and thereby lock the train through the intermeshing driving gear. The sliding rod or bar operating the locking pawls, is vertically movable in suitable guides and has a thumb piece or button projecting through an opening in the casing, by means of which, it may be manually shifted. This thumb piece being as shown, in the interior, accessible to the occupant, enables the occupant to prevent any premature setting of the meter for operation, as by the driver.

The distance train is directly controlled by this rod, which in its upward movement effects all requisite adjustments for setting the train for operation and in its downward movement, disengages and locks the driving gear, etc., and thereby renders the train inoperative.

As above stated, in the particular embodiment of my invention here shown simultaneous operation of the distance and time trains is prevented, by causing one train when set for operation to lock the other against movement. For example, on the upstroke, the sliding bar of the distance train engages and locks a similar bar of the time train, thereby rendering the latter inoperative under such adjustment.

The minimum charge indication, as a first step in the operation of the distance train, is effected through impulse ratchet mechanism which is interposed between the power shaft and the driving gearing of the distance train. This ratchet mechanism serves primarily to convert the continuous rotary motion transmitted from the axle, during the travel of the vehicle, into step by step or intermittent motion, which is transmitted to the distance train at regular intervals, when the latter is in operation. The impulses imparted to the distance train are timed by a cam, which during each revolution depresses a spring advanced rocker-arm, and the latter on the down stroke, adjusts or sets a feed pawl, and on the up stroke, under the influence of a retractile spring, causes the pawl to advance a ratchet a determined number of teeth. This ratchet is operatively connected to the driving gear of the distance train and imparts a regulated motion necessary for effecting successive indications, of half miles, in the device shown, by the distance indicator and corresponding charges of fifteen cents by the charge indicator.

To cause the distance train to first indicate the minimum distance charge of " 1 mile 30 cents " or double the ordinary showing " ½ mile 15 cents " the stroke of the feed pawl is increased. This is effected by the slide bar, when the distance train is thrown out of operation, which engages the rocker-arm above referred to, and carries it beyond its usual travel, to a point where it is sustained, until the bar is again advanced to set the train for operation, when the rocker-arm is released by a projection upon the cam, before mentioned, and under the influence of a retractile spring, advances the ratchet, which imparts the requisite motion for producing the desired indication.

Having thus under the first impulse from the ratchet feed set up an advance charge of double the amount ordinarily indicated, it becomes necessary to compensate for the increased movement and this is done by automatically disengaging the feed pawl, as it advances to impart the second impulse. The distance train therefore in failing to respond to the second impulse remains at rest until the third impulse is given, when the entire train of mechanism under a readjustment of parts, is operatively connected and answers each impulse of the ratchet by an indication of " ½ mile " upon the distance indicator and " 15 cents " upon the charge indicator.

The time train comprises in addition to a time movement, three devices:—A charge indicator, or trip register, which serves to visually represent to the passenger the amount due for the time the vehicle has been engaged or in service, under certain determined time rates; a charge totalizer or permanent register, which totalizes the amounts registered by the indicator, and a totalizing cyclometer, which registers the distance traveled by the vehicle under time rates. The construction and operation of these devices are substantially similar to those of the distance train, above referred to and they are also, in like manner controlled by a manually operated sliding bar which on one stroke effects all necessary adjustments for setting the time train for operation, and upon the reverse stroke renders the train inoperative by throwing a system of locking pawls into action. The charge indicator of this train is geared through a motion converter or an impulse ratchet mechanism, which latter is substantially the duplicate of that employed for operating the distance train and is driven by a time movement. Power is applied as before, to the right-hand drum of the series, which contains peripheral markings of the lowest order, and through direct gearing, motion from the indicator is transmitted to the charge totalizer so that these devices operate in unison.

In resetting the time train or turning the drums of the indicator back to their initial position, preparatory to the next trip or operation, the totalizer is thrown out of gear, and being continuously locked against back play or rotation, it remains at rest. The cyclometer of the time train is geared through a clutch to be driven from the axle of the vehicle and the sliding bar controlling the train also operates the clutch and thereby throws the cyclometer in and out of operation simultaneously with a like adjustment of the time indicator and totalizer.

A detailed description of the construction and operation of a taximeter representing one form of embodiment of my inventions will now be given, reference being had to the accompanying drawings.

The casing A may be of any convenient shape, but is preferably rectangular and provided with three sight openings or windows, $a$, $a^2$, $a^3$, protected by glass, through which the distance traveled, charge, etc., registered by the indicators of the inclosed mechanism may be seen. When the distance train is in operation, the number of miles and half miles traveled by the vehicle, is indicated at the central window $a^2$ and a proportionate charge therefor is shown at the adjoining window $a^3$ to the right; the passenger is thereby fully advised and can make settlement in accordance therewith. When however, the vehicle is engaged upon time rates and the time train is operating, the proportionate charge only is indicated and is exposed at the window $a$, to the left. Immediately below these openings or windows, a plate $a^4$ is hinged and has printed thereon the rates at which the vehicle may be engaged. This plate incloses or covers that portion of the casing containing openings and windows $a^5$, $a^6$, $a^7$, $a^8$, $a^9$, $a^{10}$, and $a^{11}$. Through the windows $a^5$, $a^6$, $a^7$, the amount, etc., registered by the time and distance totalizers is visible when the plate is swung back and the time train and standard cyclometers may be seen through the windows $a^8$, $a^9$. The elongated opening or slot $a^{10}$ serves as a guide and also to limit the movement of a lever $a^{12}$ which is pivoted upon the under side of the casing at $a^{13}$, and is enlarged at its upper free end to serve as a guard or shutter in closing an opening $a^{14}$ through which latter the key is inserted for winding up the time movement. This lever is swung to clear or close the key opening by a stud $a^{15}$, which projects through the slot $a^{10}$. The hinged plate is ordinarily secured by being locked against the face of the casing, to prevent access by unauthorized persons to that portion inclosed thereby. A bolt or tongue formed in part with or secured to the hinged plate enters and projects through the opening $a^{11}$, when the plate is lowered and is engaged by a lock $a^{16}$, within the casing, which latter is key-controlled from the exterior in the usual manner. The principal working parts are mounted upon a base plate $a^{17}$, detachably secured to the back plate of the casing.

In mounting the machine, it is desirable that it should be secured at a prominent point on the vehicle conveniently within sight of the passenger, and it is therefore preferably arranged as illustrated in Fig. 1 where the setting thumb-piece 17 must be actuated in view of the fare. Power from the vehicle is transmitted to the taximeter by suitable means, such for example as illustrated which consists of the gear 1 driven from a similar gear upon the axle and carried by a shaft mounted in suitable bearings and from this shaft through the bevel gears 2 and 3 to the shaft 4, which may be geared directly or indirectly through bevel gearing to a driving pinion of the worm gearing 6, 7, of the machine. The worm wheel 7 (see Fig. 20) is keyed upon a short length cross shaft 8 which may be termed the power shaft of the apparatus and from which motion is transmitted to operate various mechanisms, in a manner to be hereinafter described. To the left of the worm wheel 7, a standard cyclometer is mounted upon the same shaft and comprises, preferably, three drums, 120, 121, 122, freely rotatable about the shaft, which latter serves merely as a support or carrier therefor and may be independently rotated without in any manner disturbing or interrupting the operation of the cyclometer. These drums are marked peripherally as already described.

Suitable transfer gearing well known in the art is employed to operatively connect the series of drums and consists, as is clearly shown in Fig. 20, of twin pinions 120ᵃ, 121ᵃ, which are mounted to turn freely upon a common shaft and are relatively located to continuously mesh respectively, with equispaced crown teeth of the units and tens drums 121, 122.

To cause the drums to indicate addition in accordance with the distance traveled, a step by step motion is transmitted from one drum to the next of higher order, through the transfer gearing above referred to and results in advancing the left-hand drum 36 degrees or one space for every complete revolution of the intermediate drum, and in rotating the last mentioned drum through 72 degrees or two spaces for each complete turn of the right-hand drum disk. This is effected by providing the drum to the right with circumferential notches or crown teeth 120ᵇ, 129ᵇ, which during each revolution of the drum, successively engage the pinion 120ᵃ and cause it to advance the central drum two spaces. By likewise providing the drum 121 a single notch 121ᵇ, the requisite motion is imparted through the pinions 121ᵃ to the left-hand drum, advancing it one space.

As constructed, the cyclometer may be operated continuously but is limited to a maximum indication of 99½ miles and zero follows as the next step in the operation.

It will be understood of course that additional drums may be employed or that any suitable device of this class, known in the art, may be substituted for that shown.

Motion from the shaft 8 (see Fig. 16) is transmitted to the cyclometer through the cam 111, rocker-arm 112, spring pressed pawl 118, carried by the rocker-arm and ratchet 119 integral with the fraction disk. The cam 111 is preferably formed in part with the worm wheel 7 (see Fig. 20) and is keyed to rotate with the shaft 8, being thereby direct driven.

Referring to Fig. 16, it will be seen that this cam is of the "single drop" type, i. e., it is shaped to gradually depress the rocker-arm and at the highest point of the throw, suddenly release it, permitting a full return stroke of the arm and pawl under the action of a retractile spring 115, which latter is fixed at one end to a stud 116 projecting from the base plate and has its opposite extremity secured to a crank arm or off-set 114, of the rock-shaft 113. It will be observed that the cam does not act directly upon the rocker arm, but rather upon a spring sustained dog 117 which is limited by a stop 117ᵃ to move in one direction, and then against the action of its spring. This is rendered necessary to avoid reversing the mechanism when the vehicle is moving rearward and during such time, the rocker-arm remains motionless and the rotation of the cam in a reverse direction merely depresses the dog, swinging it about its pivot against the action of its spring, by which it is subsequently returned to normal position.

As the cyclometer is intended to constitute an independent totalizer, back play or rotation is prevented by a spring pressed locking pawl 123, best shown in Fig. 16.

The distance train comprises a distance indicator or indicating cyclometer B, a charge indicator or trip register C; a distance totalizer or totalizing cyclometer D, and a charge or permanent register E.

The distance indicator and distance totalizer as they will be hereinafter termed, are substantially identical in both construction and operation, to the standard cyclometer above described. The indicator is mounted to revolve freely upon a through transverse shaft 80, which latter serves only however as a support therefor and may be rotated or shifted laterally without in any manner interfering with the operation, adjustment etc., of the indicator.

The only points of difference between this indicator and the standard cyclometer consist in the use of a spur gear 78, instead of a ratchet, the gear being formed in part with the drum 66 thereof, and further, in the provision of individual locking pawls 61, 62, 63, connected to operate simultaneously, and which become active only when the distance train is not set for or in operation, and then engage the notched hubs and thereby lock the indicator drums 64, 65, 66 against back play. In all other respects, the construction, etc., is identical, there being circumferential notches 80ᵃ, 80ᵃ, upon the first or right hand drum and a similar notch 83 upon the central drum, also transfer gearing consisting of twin pinions 81, 84, carried by a shaft 82.

The distance totalizer consists of three drums 96, 97, 98 mounted to turn freely upon a short cross shaft 56, and operatively connected by transfer gearing 99, 100. Power from the gear 41, of the impulse mechanism is transmitted to the distance totalizer, through the intermeshing spur gear 73, formed in part or fixed to rotate with the drum 96 thereof, and operatively connected with an adjoining gear 57, keyed upon shaft 56, by a clutch, consisting of one or more sockets or openings 76 and an engaging stud 77, alined therewith and projecting from the gear 57. A spring pressed locking pawl 75 engages the teeth of a gear 74 fixed or formed in part with gear 73, above referred to and prevents back play of the totalizer drums.

By means of the clutch 76, 77, the distance indicator may be thrown in or out of gear with the driving train, the shaft being movable endwise, operates the same in a manner to be later on described.

The charge indicator comprises three drums 90, 91, 92 freely rotatable upon the shaft 80, and connected through transfer gearing 90ª, 91ª, 92ª, upon the shaft 82. The drum 90 to the right of the series, is provided with an integral gear 89, to which motion is transmitted from the charge indicator gear 85 through intermeshing pinions 86, 88, carried by a common shaft 87.

The charge totalizer is identical in every respect with the charge indicator and consists of the drums 103, 104, 105, transfer gearing 103ª, 104ª, 105ª, and a gear 69 integral with the first drum to the right of the series, to prevent back play, a locking pawl 68 carried by the shaft 60 is arranged to engage the gear and is thrown out of action in a manner to be explained later on. Power from the gear 74 is transmitted to the gear 69 through the pinions 101, 101ª carried by shaft 102.

A spring operated guard or shutter 72 is mounted upon the shaft 80 and serves to shield the indicators from sight while the distance train is inoperative, as when separate indicators are used for time and for distance charge indication.

From the foregoing, it will be understood that the drums of each series are operatively connected through transfer gearing, the purpose being of course to effect the necessary addition in registering the total distance and charge, etc. as before stated. It will be further observed that the four groups of drums comprising the distance train are operatively geared whereby power may be transmitted and applied to the right-hand drum of each series.

Attention is also called in the particular form herein shown to the system of locking pawls described, which lock the entire train when it is not in use, and thereby render the several devices inoperative and at the same time maintain the totals indicated by the totalizers.

In the operation of the distance train, motion from a continuously rotating shaft is first converted into intermittent or step by step motion and then imparted to the driving gear, at regulated intervals. This is accomplished through impulse ratchet mechanism F which will now be described.

When the distance train is not set for or in operation, its driving gear is disengaged from the power shaft 8, through the medium of a manually shifted clutch, the fixed member 10 thereof, which is spring advanced, is keyed to and rotates with the shaft 8, and at the same time has a sliding movement, limited by a pin 11 of the clutch sleeve 12, working in a slot 13, extending lengthwise of the shaft.

14, represents the loose member of the clutch which is mounted to rotate freely upon the shaft 8, endwise movement being prevented by a pin 15 entering an annular groove 8ª of the shaft.

A single drop cam 18 integral with this clutch member is adapted to repress a spring retracted rocker-arm 20, by engaging a spring sustained dog 19, carried thereby. The rocker-arm 20 is shown in Fig. 9 in the position it occupies when manually set for operation on the down stroke of the controlling slide, and the dog 19 will engage the cam 18 after said cam has been partially rotated at the beginning of the stroke. The construction and operation of the rocker-arm, dog, cam, etc., are similar to those parts above described in connection with the standard cyclometer, and in consequence any rearward movement of the vehicle will be rendered ineffective for the reason above stated.

The rocker-arm 20 is fixed to or formed in part with a sleeve or tubular rock-shaft 21, to which arms 22, 23, are also fixed, the free end of the arm 22 serving as one point of attachment for the retractile spring 24. A short rack bar 29 pivoted between upper terminal lugs of the arm 23 is guided by a grooved oblique 29ª, mounted upon an upright of the base plate, and engages a pinion 30 formed in part with a sleeve 30ª loose upon the shaft 8. This sleeve also has formed in part with it, a crank arm or offset 31, upon which the main feed pawl 32 is pivoted and sustained in operative position by a suitable stop and spring. Motion from the main shaft is therefore transmitted through the clutch 10, 14, cam 18, rocker-arms 20, 23, rock shaft 21, rack bar 29 and pinion 30 to oscillate the feed pawl.

When the distance train is not set for or in operation, the pawl is tripped by engaging an upright of the base plate, and thereby disengage from the ratchet 40, as is shown in Figs. 11 and 22, but in oscillation, it serves to periodically advance the ratchet a determined number of degrees. The intermittent rotation of the ratchet thus effected, is transmitted to the distance train through an intermeshing gear 41 integral with the ratchet disk. This gear engages and drives the drum gear 73 of the distance totalizer. Ordinarily therefore an impulse from the ratchet mechanism results in a quarter turn of the first or right-hand drum of each series and an accompanying indication and addition of "½" mile by the distance indicator, "15" cents by the charge indicator, and a corresponding movement by the totalizers, registering these amounts.

Through the employment of an auxiliary ratchet and pawl 32ª, 40ª, the ratchet mechanism is rendered self adjusting in regulating the impulses for effecting an indication of the minimum charge, etc., by the distance train, as a first step in the operation: a failure of the train to respond, as a second step, and a readjustment to subsequently indicate and register the scheduled rates, for every additional half mile covered by the vehicle in travel during a trip made under distance rates.

The auxiliary ratchet is loosely mounted upon the flanged end of the sleeve 30ª, at which point it is axially alined and parallel with the ratchet proper 40. Its rotary movement is limited however, by an integral stud or pin 40ᵇ engaging a stop 40ᶜ in an annular groove or cavity 40ᵈ formed in the face of the sleeve flange. Normally the auxiliary ratchet is yieldingly held against rotation in one direction by a spring 40ᵉ lying within the groove and positively against movement in the opposite direction by the engaging stop pins.

The auxiliary ratchet disk is provided with three teeth 40ᶠ, 40ᵍ, 40ʰ, with which the feed pawl 32, successively engages, as will be later on described. Two of these teeth 40ᶠ, 40ʰ, arranged at diametrically opposite points of the disk, are full depth, i. e., cut sufficiently low to permit the feed pawl, when in engagement herewith, to at the same time engage a tooth of the main ratchet 40, and advance both disks simultaneously. The third tooth 40ᵍ however, is what may be termed a high tooth, it being shallow cut at a peripheral point on a line at right angles to or midway of the full depth teeth and of a depth such, that when engaged by the pawl, sustains the latter during its advance in an elevated position, clear of the main ratchet. It is under this adjustment which occurs as a second step in the operation of the distance train, that the indicators, totalizers, etc. thereof remain at rest, by reason of the fact that the feed pawl during its forward stroke fails to engage and rotate the main ratchet. Under the influence of its spring and stop only, the auxiliary ratchet disk is sustained in such position with respect to the feed pawl, as to present a full depth tooth for engagement therewith. This is clearly shown in Fig. 22 which illustrates the relative arrangement of these parts when the distance train is not set for nor in operation.

The adjustment of the feed pawl to the position shown in Fig. 22 is effected manually, through mechanism to be later on described, its movement in oscillation however, after the first stroke, is illustrated in Figs. 23 and 24.

As the feed pawl swings forward on its first stroke, it engages and advances both the main and auxiliary ratchet disks and in moving from the position illustrated in Fig. 22 to that shown in Fig. 23, these ratchets rotate a half revolution or a distance necessary for effecting an indication of the minimum charge.

On the back stroke of the feed pawl, the auxiliary ratchet disk becomes relatively adjusted to present its "high tooth" for engagement therewith preparatory to the second stroke. This is brought about through the coöperation of the auxiliary gravity pawl 32ª, which on the forward stroke of the feed pawl is released by the rotation of a cam 31ª and falls into operative position engaging the full depth tooth as the disk is advanced in the first instance, and thereby retains it under tension, i. e., against the action of its spring as the main pawl returns for the second stroke.

In the second advance, the pawl in engagement with the high tooth of the auxiliary disk clears the main ratchet, and in consequence the distance train remains at rest, the gravity pawl however, again coming into play locks the auxiliary disk under an increased tension of its spring, by engaging the high tooth thereof, while the feed pawl returns as before (see Figs. 25, 26). In this movement the second full depth tooth or notch of the auxiliary ratchet is presented, and the pawl in entering the notch also engages the main ratchet and on the third stroke, again advances both disks. Under the impulse thus given, the several devices of the distance train respond and a second indication is made, adding "½" mile "15" cents to the minimum charge, and showing "1½" miles "45" cents.

Having performed its intended function, the auxiliary ratchet is rendered inactive during the remainder of the trip or until the distance train is manually readjusted, by having its second full depth tooth engaged and locked by the auxiliary pawl, the main feed pawl however in each subsequent oscillation engages and advances the main ratchet the distance of one tooth, as shown in Fig. 27.

The adjustment of the mechanism by means of which the distance train may be thrown in or out of operation, is controlled by a slide bar 9. This slide bar is provided with a thumb piece 17, which projects through an opening in the side of the casing, by means of which it may be readily shifted. To prevent unnecessary play of the bar and retain it when adjusted, a flat friction spring 127 is secured to the thumb piece and in moving with it bears against the casing.

The slide 9 when shifted to throw the distance train out of operation, rotates the rock shaft 21 by engaging the stud 19ª upon the arm 22 thereof. The motion thus imparted serves to set the rocker arms 20 and 23 at a point beyond their ordinary movement in oscillation, under the tension of the retractile spring 24 by which they are advanced and also adjusts the feed pawl to the position shown in Fig. 22. At the same time the cam integral with the feed pawl carrying arm, in rotating therewith, releases the auxiliary pawl and the latter swings downward into operative position. The rocker arms, etc., are sustained thus adjusted, first by the direct engagement of the slide 9 with stud 19ª of arm 22, and secondly by a similar engagement between this stud and the lower end of a spring pressed lever 47 (see Figs. 6, 8) which is pivoted at 47ª to an upright from the base plate. This lever is provided with two notches or depressions 46, 46ª, into the first mentioned of which the shank 45 of the thumb piece takes, when the slide is at the limit of its downward movement, at which point it is thereby yieldingly retained. The first movement in shifting the slide upward depresses the lever 47 sufficiently and against the action of its spring 47ᵇ to clear the stud 19ª, whereupon under the influence of the spring 24, the several rocker-arms, feed pawl, etc. advance slightly, but are again checked by a spring pressed lever or dog 26 pivoted to an upright from the base plate, which engages the upper extremity of the rocker-arm 20. This limited forward movement clears the feed pawl and the latter engages both the main and auxiliary ratchet disks.

The continued upward movement of the slide, to a point where the shank of the thumb piece takes into the second notch 46ª of the lever 47 carries an integral cam or projection 16 of the slide, clear of the movable clutch member 10, and the latter under the action of its spring 12ª, moves into engagement with the fixed member and thereby operatively connects the impulse ratchet mechanism with the main shaft 8.

Upon an extension 51 of the slide 9 (see Fig. 8) a cam surface or off-set 52 is suitably formed, either by an integral enlargement or a separate plate fixed thereto, and is adapted to work in an annular groove between two collars 54, 55, fixed to the shaft 56 (see Fig. 19) the incline or cam being of proper form to shift the shaft to the left in the direction of its length and effect an engagement between the clutch members 76, 77 of the gears 57, 74, whereby the driving gears of the totalizers and indicators of the distance train are operatively connected.

The slide extension 51 terminates in an enlarged head, which upon the upstroke releases the distance train from the entire series of locking pawls above referred to, by engaging a projection 58 of an arm 59 and the arm in being forced upward, rotates the pawl shaft 60 upon which it is keyed. The extension head also engages and elevates an independent spring pressed locking pawl 68 of the charge totalizer gear and at the same time, engages a stud 71 and shifts the shield or shutter to expose drum markings of the indicators, all of which is clearly shown in diagram, Fig. 32.

Assuming that the slide has been moved upward and the various adjustments made, as described, the distance train will be set for operation, but before an indication can be effected, the ratchet mechanism must be released from the locking pawl 26, and this is accomplished through a stud or projection 28 upon the cam 18. As the highest point of the cam in rotation clears the dog 19, the stud 28 is brought into engagement with the underside of the locking dog 26 and elevates it, thereby releasing the ratchet mechanism, and the latter under the action of the spring 24, operates as before described, and effects the minimum charge indication, by reason of the increased stroke of the rocker-arm 23, etc.

In readjusting the distance train at the end of a trip during which it has been in operation, the first step is to shift the slide 9 to the limit of its downward movement, and this serves to effect a reversal of all adjustments made upon the upstroke thereof. That is to say, as the extension head of the slide is withdrawn, the locking pawls are released and free to operate under the influence of their actuating springs, but inasmuch as the pawls of the distance indicator are connected to act in unison, they do not become effective until the notches of the drum hubs are brought into alinement and this occurs only when the drums are in their initial position. The spring pressed pawl 68 however, being freely mounted upon the shaft 60, when released, at once engages and locks the gear of the charge totalizer, against rotation in either direction.

To insure a full accounting for the distance traveled by the vehicle when engaged under distance rates, and to avoid attempted fraudulent manipulation of the train, provision is made for locking the slide when shifted to throw the train out of operation, against subsequent upward movement until the indicators have been turned back to zero. This is accomplished by an inclined projection 53ª (see Fig. 7) of the slide extension head, engaging a stud 59ª of the arm 59 fast upon the shaft 60. The projection 53ª in moving downward, passes under the stud, through the yielding action of the spring held shaft. The arm being forced outward thereby, is immediately returned to its former position, with the stud in the path of the travel of the shoulder 59ᵇ of the extension head, thus preventing upward movement of the slide. Upon the indicator drums being turned back to their initial position, the hub notches thereof become alined and the shaft 60 under the action of its rotated spring is in forcing the locking pawls into engagement therewith. This slight rotary movement of the shaft 60 serves to depress the arm 59 sufficiently to carry the stud 59ᵃ clear of the extension head, and permit its subsequent advance for resetting the distance train for operation.

The guard or shutter is also released when the slide is moved downward and is spring held, closing off the view of the indicators, while they are being turned back to zero. To avoid strain upon the mechanism, as for example, by attempted continued rotation of the reversing shaft 56 after the indicators have been fully set back, a locking device is provided and consists of a collar or flange 55 fixed upon the shaft 56 and having oppositely disposed peripheral notches into which a terminal projection from the lever 59, takes and locks the shaft 56, against rotation at the instant the indicator drums in being reversed, reach their initial position. To facilitate the manual rotation of the reversing shaft, a knob button or other form of turning handle 50 is swiveled in an upright 94, of the base plate, and loosely incloses the outer end of the reversing shaft, it being provided with a flange upon which is mounted a spring pressed pawl 95. This pawl, when the train is not set for or in operation, i. e., when the slide is at the limit of its downward movement, engages a notch 95ᵃ formed in a reduced portion of the collar 55 fast upon the reversing shaft, as shown in Figs. 8 and 19 of the drawings, thus operatively connecting the shaft with the reversing handle or knob. When the train is set for or in operation, however, the slide in its upward movement shifts the reversing shaft in the direction of its length and the notched collar 55, is thereby carried inward clear of the pawl of the reversing knob.

To turn the drums back into their initial position, the slide is moved downward, and its cam or inclined portion 52 in passing between the collars 54, 55, adjusts the shaft 56 as above stated, in the direction of its length, toward the right, a distance sufficient to disengage the clutch, i. e., the projections 77 of the gear 57, from the socket 76 of the gear 74. In this manner the totalizers are thrown out of gear and held against play or rotation by their locking pawls. The adjustment of the shaft 56 also serves to shift the collar 55 into operative relation with the locking lever 59 and the spring pressed pawl of the disk 49, which as the knob is turned by hand, engages a notch of the collar and through the shaft 56, and gear 57, motion therefrom is transmitted to the indicators. As before mentioned, the locking pawls of the indicators become effective only when the notches of the drum hubs are brought into alinement and the lever 59, moving in unison therewith, enters a notch of the collar 55 and locks the same, preventing further rotation of the shaft 56, by the knob.

In resetting the totalizers, it is also necessary to readjust the cam 18, upon the main shaft 8, so that the highest point will clear to permit a full stroke of the rockerarm as a first step in the operation of a ratchet mechanism. This is effected through the employment of a gear 109, loose upon the shaft 8, and driven from the gear 57, by interposed twin pinions 107, 108, carried by a short shaft 106. Upon the side of the gear adjoining the cam, a spring pressed dog 110 is pivoted and adapted on rotation in one direction to engage a notch of the hub or collar of the cam and carry the latter around to the proper position, at which point it comes to rest as the gearing is locked by the pawls against further rotation.

The general construction and arrangement of the mechanism of the time train is substantially similar to that of the distance train above described, and comprises, a charge indicator or trip register G, a charge totalizer or permanent register H, and a totalizing cyclometer I.

The indicator and totalizer are peripherally marked and properly geared to register in accordance with the time rate schedule of one dollar per hour, and while a visual indication of the charge only is made by the train, as at present constructed, it will be apparent, that an accompanying time indication could be readily provided without involving material change, but this is not considered essential.

The charge indicator G, in the form illustrated differs from the several devices of both the distance and time trains, in that it employs but two drums 139, 140. This number is usually sufficient for registering the ordinary trip charge under time rates, as the disks are marked to indicate up to $9.75 or for a period of engagement of the vehicle for 9¾ hours.

The indicator drums which turn freely upon the shaft 80 are connected through transfer gearing i. e., an intermeshing pinion 181, to indicate addition in a manner above described in reference to the several devices of the distance train, and are also provided with individual locking pawls 135, 136, carried by a spring held shaft 134 (see Figs. 14 and 18) which take into notches of the hub flanges 137, 138, when the same are brought into alinement. A spring retracted shutter 150 serves to shield the indicator from view when the time train is not set for or in operation. 141 represents a gear secured to or formed in part with the first or right-hand drum of the indicator and through which motion is transmitted to the totalizer, etc., as will be described.

The charge totalizer H is loosely mounted upon a short length cross shaft 198, and consists of three drums 205, 207, 208, connected though transfer gearing 209, 210. The first drum 205, of the series is provided with circumferential notches 204, which are engaged by a continuously acting locking pawl 206, either of the spring pressed or gravity type. 203 represents a gear, freely rotatable upon the totalizer shaft and meshing with the indicator gear, before referred to. When the time train is set for or in operation, this gear 203 is connected with the totalizer 205, by a stud or pin 202, of an arm 201, carried and adjusted by the totalizer shaft, as will be later on described. Thus the totalizer is geared to have a "follow up" motion with respect to the indicator and is locked against back play or rotation by the pawl 206, before mentioned.

The totalizing cyclometer is the duplicate in every respect of the standard cyclometer described. It consists of three drums 222, 223, 224, freely rotatable upon a tubular portion of the main shaft 8, and connected through transfer gearing 225, 226. As in the other instance, the right-hand drum is provided with an integral ratchet 217, a spring pressed locking pawl 217ª continuously engaging therewith, and a feed pawl 216 carried by a rocker-arm 214, which latter is mounted upon a sleeve 218, under the influence of a retractile spring 220 secured at points 219, 221.

213 represents a cam mounted loosely upon the shaft 8 adjacent to the ratchet, and which in rotation oscillates the rocker-arm 214 by engaging a spring held projection or dog 215, carried thereby.

Motion from the main shaft 8 is transmitted to the cam through a clutch (see Fig. 20) the movable member 159 of which is keyed to the shaft by a pin 158, having a limited play in a longitudinal slot thereof, and is advanced under the action of a spring 160. The other or fixed member 161 of the clutch, is integral with the cam 213, it being formed upon the flanged end of the cam sleeve. The clutch is controlled by a shift rod 156, telescoping within the tubular portion of the main shaft 8, and engaging the pin 158, as shown.

J represents a standard time movement from which motion is transmitted to the train, through impulse ratchet mechanism K, substantially similar to that employed and described in connection with the distance train.

The main and auxiliary ratchet disks KK² and the feed pawl carrying arm K³ and pinion K⁴ integral therewith, are mounted side by side, and rotate freely about the shaft 80. The main ratchet is fixed to or formed in part with the indicator drum gear 141, while the auxiliary ratchet has a limited rotation under the influence of a spring and stop and is mounted upon the projecting end of a sleeve formed in part with the feed pawl carrying arm and pinion in a manner similar to that illustrated in Figs. 31 and 32. The minimum charge indication of "$1.00" as a first step in the operation of the time train, is exposed at the proper opening or window of the casing, shortly after the engagement of the vehicle, for the information of the occupant thereof, advising him of the amount due for the first hour, and at intervals of fifteen minutes thereafter, a further indication of "25" cents is made and added to the original charge. It is therefore essential in the construction of the auxiliary ratchet disk, to provide three "high" teeth in connection with two diametrically disposed "full depth" teeth, for the purpose of carrying the feed pawl clear of the main ratchet, during the three forward strokes, occurring at intervals of fifteen minutes, following its first advance. This results in the time indicator and totalizer remaining at rest for the hour following the indication of the minimum charge. On the fifth stroke the feed pawl K⁵ preparatory to its advance, engages the second full depth tooth, of the auxiliary ratchet, which is presented through the co-operation of the auxiliary locking pawl K⁶, and at the same time includes a tooth of the main ratchet, thereby advancing both disks, and imparting an impulse to the time train *i. e.*, the indicator and totalizer. This results in an addition of "25" cents to the minimum charge of "$1.00" or an indication of $1.25.

Having reached the limit of its forward stroke, the feed pawl is returned by the motor or time movement, in a manner to be described, but the auxiliary ratchet disk is held by the auxiliary locking pawl engaging the second full depth tooth thereof and thus retained inactive until the time train is manually thrown out of operation.

As described, in the operation of the distance train, etc., in first indicating the minimum charge, the stroke of the feed pawl is increased, by manually setting or adjusting the same to a point beyond its usual travel in oscillation, and this effect is produced in like manner in connection with the time train upon the downward movement of the controlling slide 124, as the latter is manually shifted to throw the time train out of operation. It will thus be seen that if for time or distance charge the initial or minimum charge is the same and the increments the same, then the charge would be identical for either method of charge for like number of unit increments of either time or distance, and in indicating drums suitable for such condition may be employed.

In the form shown the connection between the ratchet mechanism and the controlling slide bar of the time train, is best shown in Figs. 6, 8, and 13, and comprises, a rack bar 167, which is pivoted at its upper end to a spring advanced rocker-arm 168, 168$^a$ and engages a pinion K$^4$, integral with the carrying arm of the main feed pawl, it being retained in proper relation therewith by a grooved guide roller 167$^a$ mounted upon an upright of the base plate. Thus it will be seen that a back and forth movement of the rack bar will advance and retract the pawl and move the main ratchet disk, also that an extended movement of the rack bar will effect a like adjustment of the pawl and a corresponding increase in the rotation of the ratchet.

Such an extended movement is given the rack bar upon the down stroke of the controlling slide through a horizontally swinging lever 133 pivoted centrally and engaged at one end by a projection 132 of the slide and engaging at its opposite end, a projection or shoulder 234 of the rack bar. When thus adjusted, the rack bar is locked by a spring pressed dog 166, which is notched to engage the same, as is clearly shown in Fig. 13. The controlling slide may therefore be moved upward to effect the necessary adjustments for setting the time train for operation, but the impulse ratchet mechanism under the action of the dog 166, is maintained in an inoperative state, and remains so until the vehicle has moved forward a distance sufficient to rotate the main shaft 8 through the greater portion of a revolution. The actual operation of the time train, i. e., its release, is therefore rendered dependent upon the travel of the vehicle, which serves as a check upon the time motor or movement, until travel has actually begun. Once released, however, the rack bar advances and is not again during the trip engaged by the locking dog 166 by reason of the fact, that its movement is limited and in playing back and forth under the pawl, the engaging extremities overlap and are not permitted to come into locking relation, until, under the action of the controlling slide, the rack bar is carried beyond its usual travel, and in passing from under the pawl, permits the latter to fall into engagement. The mechanism for releasing the pawl 166 (see Figs. 20, 20$^a$) consists of a disk 163, which is mounted upon the sleeve integral with the loose member of the clutch 161, 159, it being rotated in one direction thereby through an interposed pawl and ratchet 161$^a$, 162, and free to turn in the opposite direction under the action of a second ratchet and pawl 211$^a$, 212, the pawl last mentioned being carried by a gear 211, meshing with the charge totalizer of the time train. This disk is provided with one or more teeth 164, which in rotation, move into engagement with a stud or projection 165 of the dog 166, and in passing thereunder lift the latter and thereby release the rack bar of the time train ratchet mechanism. It will be observed that in the release of this mechanism, it is essential that the clutch members be engaged, so that power may be transmitted from the main shaft 8 to the disk 164. This is effected through the rod or shaft 156, when the controlling slide is moved upward to set the train for operation, as will now be described.

Referring to Fig. 15, 144 represents a rock shaft having arms 145, 146 keyed thereon, and these arms in turn support a shift rod 144$^a$ which engages fixed collars 157, 199 of the spring retracted shafts 156, 198. One end of this rod is extended, and enters a notch 147, of a pivoted lever 148, whose free end 149, engages a projecting toe or extension of the indicator shutter, and when the time train is not set for or in operation, depresses the toe, throwing the shutter upward against the action of its spring, and thereby closing off the view of the indicator. The frame, through the endwise movement of the through cross shaft 80, is rocked to the left or right, accordingly, as the clutch members 159, 161, and 202, 202$^a$, are to be shifted into or out of engagement, the frame being operatively connected to the shaft 80, by having its rod 144$^a$ lying in an annular groove formed between collars 142, 143 of a sleeve fixed thereon. The shaft 80 is adjusted in the direction of its length by a cam plate 235 of the controlling slide, working between collars 131, 131$^a$ fixed thereon, as is clearly shown in Figs. 8 and 18. The controlling slide is provided with a thumb piece 126 and friction spring 127$^a$ similar to those employed in connection with the distance train slide and by means of which it may be shifted. Upon the up stroke, the time train slide, during the first portion of its movement swings the lever 133 around to clear for the subsequent advance of the rack bar 167, and at the same time, shifts the shaft 80 toward the left, and under this adjustment a notched disk 130 fast upon the shaft at a point adjacent to the terminal knob 236 thereof, is engaged by a stud or pin 153, which projects from an upright of the base plate, and locks the shaft against rotation. This shaft is utilized (see Figs. 18, 18$^a$) in reversing the time train, i. e., turning the indicator back to its initial position and for this purpose a sliding clutch is provided consisting of a stud or pin 154 carried by the shaft and relatively disposed to coöperate with any one of a series of radial notches 154ᵃ formed in the hub 137 of the indicator drum 139. The endwise movement of the shaft 80 therefore in addition to releasing the shutter, which is at once carried downward by the action of its spring to expose the indicator to view; also disengages or opens the clutch last mentioned and rocks the shift frame which results in closing the clutches between the main shaft and time train and the indicator and totalizer thereof. It now only remains to release the indicator drums from the locking dogs, 135, 136, and the train will be set for operation. This is brought about by a stud 128 upon the controlling slide, which in its upward movement, engages an inclined projection 129ᵃ and is guided thereby into a notch 129ᵇ of the dog 129. This dog is fast upon the pawl shaft 134, and in being carried upward by the movement of the stud 128, rotates its shaft sufficiently to disengage the pawls and free the indicator drums.

Having thus set the train for operation, the release of the ratchet mechanism, i. e., the rack bar thereof, follows as the next step, and as before stated, this occurs during the first revolution of the main shaft, which is vehicle driven. Assuming that this has been effected by the elevation of the locking dog 166, under the action of the rotating projection of the disk 163, the rack bar will be advanced by the spring 168ᵃ (see Fig. 13) and through the interposed mechanism, cause the indicator to register the minimum charge the same being shown by the totalizer in a follow-up motion through the intermeshing gears. In advancing the rack bar, the rocker-arm moved downward and whereupon a brake 197, acting upon a gear 186 of the time movement, is thrown off by the action of a spring attached to an arm of the brake shaft. The application of the brake is effected by the rocker-arm engaging a right angular projection 182, 183, of the brake shaft in its upward movement, that is to say, when it is manually set by the controlling slide. In the ordinary oscillation of the rocker-arm the brake remains off. Between the time movement and the ratchet mechanism there is interposed a device by means of which the rack bar is periodically withdrawn against the action of its spring, and released to impart the impulse necessary for effecting indications by the time train at intervals of fifteen minutes. This device comprises a tappet wheel 195, having four slightly curved arms or tappets arranged to successively engage a stud or antifriction roller 196, upon the rocker-arm, and force the latter upward, thereby withdrawing the rack bar, and in passing the roller 196, releasing and permitting the same to advance under the action of its spring. This tappet wheel is formed in part with a sleeve which is mounted freely rotatable upon a shaft 190, and is provided at one end with a ratchet or notched flange 230 (see Fig. 14) the latter being engaged by a pawl 229 upon a gear 228, turning freely upon 190. This bevel gear meshes with a similar is flanged and carries a spring pressed pawl 193 which engages a ratchet 192 formed in part with a bevel gear 191 loose upon shaft 190. This bevel gear meshes with a similar gear 189, which is driven from the gear 187 of the time movement, through the interposed pinion 188.

From the foregoing it will be apparent with reference to Figs. 13 and 14, that with the time movement in operation, the ratchet driven by the pinion, bevel gearing, etc., will rotate toward the right, i. e., in the direction of the hands of a watch, and through the pawl 193 engaging therewith, motion in the same direction will be imparted to the tappet bringing the arms successively into engagement with the roller of the rocker-arm, as above described.

The tappet wheel is geared to rotate through a complete revolution once every hour during the operation of the time train and therefore withdraws or elevates the rocker-arm and rack bar at intervals of fifteen minutes.

In throwing the time train out of operation, the controlling slide is shifted and in its downward movement, reverses the several adjustments previously made upon the upstroke, that is to say, the clutches are disengaged and the totalizing cyclometer and charge totalizer thereby thrown out of gear and locked against rotation; the rack bar is reset to effect an indication of the minimum charge, in its first advance, and it, in turn, engages and depresses the auxiliary pawl and thereby releases the auxiliary ratchet which being free and under the action of its spring, is at once returned to its initial position, i. e., presenting its full depth tooth for engagement with the main feed pawl; the brake is also applied in the movement of the rack bar and stops the time movement; the shutter closes off the view of the indicator; the locking pawls are released, but are held out of engagement until the drum notches become alined, and the cross shaft 80, by which the totalizers are turned back to zero, is readjusted, by being shifted endwise until, its disk 130 is clear of the locking pin 153 and may be hand rotated in one direction, i. e., toward the right, as viewed in Fig. 7, it being positively held by the spring dog 241 against rotation in the opposite direction. The controlling slide, when shifted to throw the time train out of operation, becomes locked, and is thus maintained against upward movement until the indicators have been turned back to zero, their initial position. Upon the down stroke, the slide releases the locking pawls, and their carrying shaft rotating under the action of the spring, tends to force them into engagement with the notches of the indicator drums, but as the disks have not been turned to zero, the notches are not alined, and therefore the pawls lie in contact with the drum hubs or flanges. This slight rotary movement of the pawl shaft is utilized to adjust a locking pin 232, into the path of travel of a projection 233 of the slide. The pin 232 is carried by an arm or off-set 231 of the dog 129, fast upon the pawl shaft. The projection 233, has an inclined surface which in the downward movement of the slide, engages the pin and the latter yields, permitting the pin to pass thereunder, and then drops back into position and effectually resists any attempted advance of the slide.

In returning the drums of indicator to their initial position, the shaft 80 is rotated toward the right by means of the terminal knob, and at the instant the drums indicate their initial position, they become locked by the pawls entering the hub notches, which latter have become alined, and at the same time, the dog 129 locks into a notch of the disk 130 upon the shaft 80, and the latter is held against rotation in either direction. This additional rotation of the pawl shaft serves also to depress the slide locking pin 232 below the path of travel of the slide projection 233, as shown in Fig. 7.

In turning the indicator drums back to zero, by means of the shaft 80, a train of gears is brought into action, to reset the releasing device of the ratchet mechanism, and further to adjust the tappet wheel into proper relation with the rocker-arm. Thus the first impulse and resulting indication will be regulated to occur only after the vehicle has traveled a determined distance, which may be five, ten, or fifty feet, as may be found desirable, and secondly, the tappet will be properly adjusted to avoid interference and permit the rocker-arm, during the first advance of the rack bar, to make a full stroke. The resetting of these devices is accomplished through a train of intermeshing gears, 228, 227, 141, 203, 211, and motion is transmitted thereto from the indicator gear 141. The terminal gears 228, 211, are each provided with a spring pressed pawl and are thereby operatively connected with the tappet wheel ratchet, having four teeth and a ratchet of the disk 169 having two teeth. It will be observed that the number of teeth of the ratchet corresponds with the number of tappets, the same being true of the disk projections and its ratchet. Therefore, when rotated in one direction or intermittently under the impulses from the ratchet mechanism, the pawls yield and slip over the ratchets, but in moving in the opposite direction, or under the action of shaft 80, when manually rotated, the pawls engage the ratchets and carry the tappet wheel and disk around with them and reset the same when the indicator becomes locked at zero and the train comes to rest.

The device by which the controlling slides are caused to interlock, in the form of my taximeter herein particularly referred to consists of levers 47, 48, pivoted respectively at 47$^a$, 48$^a$. These levers are acted upon by the spring 47$^b$ which tends to force them apart, that is in opposite directions, and against the studs or projections 45, 48$^b$, of the slides. When the distance train slide is fully advanced, as represented in Fig. 8, the stud 45 thereof forces the lever 47 downward, in opposition to the spring, and thus adjusted, the lever 47 limits the upward movement of the lever 48 to such an extent as to permit the disengagement of the notch 48$^c$ thereof from the stud 48$^b$. Thus it will be seen that the adjustment of the slide to set the distance train, effectually prevents a similar movement on the part of the time train slide. On the other hand, when the latter is advanced to set the time train, the stud 48$^b$ thereof on its forward movement elevates the lever 48, and the latter in turn serves to check the downward movement of the lever 47 and thereby locks the controlling slide of the distance train.

In the particular embodiment of my invention just described the operation is briefly as follows:—Assuming that the vehicle is engaged under distance rates, the motorman or person in charge thereof, before starting on the trip, shifts the slide or lever controlling the distance train and in its upward movement, this slide or lever through its various connections above described, sets the train for operation, that is to say; the guard or shutter is swung clear to expose the indicators at the sight opening or window; the indicators are released through an adjustment of the locking pawls, the indicators and totalizers are connected by the engagement of the clutch forming part of the driving gear thereof; the main pawl of the impulse ratchet mechanism is advanced sufficiently to engage both the main and auxiliary ratchet disks; the distance train clutch is closed connecting the impulse mechanism with the main or vehicle driven shaft and the time train is rendered temporarily inactive or inoperative by the interlocking action of the controlling slides.

It will be observed that by the mere upward movement of the slide or lever, all requisite adjustments are made for setting the train and it now remains for the mechanism to be vehicle released, that is to say, the actual operation does not begin until the vehicle is in travel and has covered a distance sufficient to effect the release of the impulse mechanism, through the gearing described. Immediately following this step, an impulse is imparted by the ratchet mechanism to the driving gear of the train, resulting in a visual indication of the minimum charge, as 1 mile 30 cents, which is registered by a similar movement on the part of the totalizers. In the delivery of the first impulse, the auxiliary pawl becomes disengaged from a cam forming part of the ratchet mechanism and falls by gravity into locking relation with the auxiliary ratchet disk, retaining the latter in opposition to its spring, as advanced by the main pawl. Upon moving forward the second time the main pawl is carried clear of the main ratchet by engaging the high tooth of the auxiliary disk and as a result, the train remains at rest and the original indication etc. are maintained until the main pawl is again advanced or moves forward the third time, when by reason of its engaging both disks, the train responds and an additional one-half mile 15 cents is indicated and the total appears at the window as "Miles 01½ $0.45." During the continued operation of the impulse mechanism, the auxiliary disk is relatively sustained by its locking pawl to present a cut away portion above which the main pawl oscillates and clears in subsequently advancing the main ratchet.

When the vehicle has been discharged by the fare from further service, the motorman restores the indicators to their initial position or zero, by first shifting the slide downward. This movement in reversing the several adjustments above enumerated serves to disconnect the gearing of the indicators and totalizers and releases the reversing shaft and knob which latter may then be rotated, the motion being transmitted to the indicators through the intermeshing gearing above described.

When the vehicle is engaged upon time rates, the motorman shifts the controlling slide or lever upward and thereby effects all adjustments necessary for setting the train for operation. This is to say, the guard or shutter is swung to clear the indicator and expose the same at the sight opening or window; the locking pawls are disengaged to release the indicator drums; the clutch forming part of the driving gear is closed connecting the indicator and totalizer; the setting lever is adjusted to permit the advance of the rack-bar of the impulse mechanism; the time train clutch is closed connecting the train with the main or vehicle driven shaft and through the interlocking action of the controlling slides, the distance train is temporarily rendered inoperative. Thus the train is set by a single movement of the controlling slide or lever and similar to the distance train, the actual operation does not begin until the mechanism is vehicle released or until the vehicle in travel has covered a distance sufficient to rotate the main shaft and cause a projection carried thereby to actuate the train locking device or locking pawl of the impulse mechanism. Once released, the ratchet mechanism acts immediately and imparts the first impulse which results in an indication of the minimum charge, as 1 dollar. The movement of the rack-bar, etc., in advancing to deliver this impulse, serves also to take the brake off and free the train motor which is at once thrown into operation and thereafter supplies power for actuating the impulse mechanism as before described. In the second, third and fourth advances by the main pawl, it is carried clear of the main ratchet by successively engaging three high teeth of the auxiliary disk and therefore the original indication, etc., are maintained and the train, i. e., the indicator and totalizer thereof remain at rest for an hour following the first indication. The cyclometer of the train operates continuously, however, it being driven through the clutch connection direct by the main shaft to register the distance traveled while the time train is in operation. As the pawl advances for imparting the fifth impulse, it engages both the main and auxiliary disks and carries them forward, the train responds and indicates and registers an additional charge of 25 cents which is added to the original amount and the total appears at the sight opening or window as $1.25. Upon the advance of the rack bar in delivering the first impulse, the auxiliary pawl is released and under the action of its spring, instead of by gravity as described in connection with that of the distance train, it becomes inoperatively adjusted with relation to the auxiliary ratchet. In moving forward under the influence of the main pawl as the latter advances the fifth time, the auxiliary ratchet is retained by its locking pawl so as to present a cut away portion over which the main pawl travels and clears an oscillation when subsequently advancing to engage the main ratchet disk. On completing a trip, the motorman shifts the slide downward reversing the several adjustments previously made which throws the train out of operation by applying the motor brake and disconnecting the train and vehicle driven shaft. This readjustment also serves to connect the reversing shaft with the indicator, through the interlocking clutch members carried thereby, and upon rotating the shaft, motion is transmitted direct to the first drum of the indicator and through the back gear to the second disk.

As before stated, the standard cyclometer is direct driven by being mounted upon the main or vehicle driven shaft and operates independently of the trains to register the total distance traveled.

The term "train" is herein employed merely for convenience and may comprise any desirable number of indicators and totalizers of any well known or suitable form and I therefore do not wish to be understood as limiting myself to either the construction of these devices or their arrangement as illustrated and described. It will be apparent that additional indicators, totalizers, etc., may be employed or the present number decreased without involving material change in either the driving gear or controlling mechanism.

The terms "impulse mechanism" "ratchet mechanism" "impulse ratchet mechanism," etc., employed in the foregoing description and hereinafter in the annexed claims, refer to the mechanism or device interposed between the train and its source of power. In the present embodiment this device comprises essentially an ordinary ratchet feed and an auxiliary ratchet and pawl, combined in a manner to periodically impart impulses to the registering train and is automatically adjustable in regulating such impulses whereby the indications, etc. may be varied, as above set forth in the description of the "minimum charge indication".

To facilitate the manipulation of the controlling levers, reversing knobs, etc., I may find it desirable to provide means for extending these parts to a point within convenient reach of the motorman's seat. Such means are however commonly employed and I therefore do not deem it necessary to either illustrate or describe the same.

To render the indicators readable at night, any well known means of illuminating the same may be employed, but this will not be necessary in a well lighted vehicle.

Various changes, additions, etc., other than those mentioned may be made, without departing from the spirit of my invention.

Having described my invention what I claim is:

1. In combination, a vehicle driven distance train and motor driven time train, and means appurtenant to the latter adapted to release it upon a predetermined movement of the vehicle.

2. In combination in a device of the class specified, a vehicle driven distance train and motor driven and vehicle released time train, and means appurtenant to both trains whereby either train may be adjusted into or out of operative relation.

3. In a taximeter, the combination of a motor driven time train, and means adapted to release said train, said means operated by a predetermined movement of the vehicle.

4. In a taximeter, the combination of a motor driven time train, and means adapted to release said train, said means operated by a predetermined movement of the vehicle and a continuously operating distance totalizer.

5. In combination, a vehicle driven distance train, a motor driven and vehicle released time train, and means appurtenant to said trains for operatively engaging one or the other of the trains of mechanism as desired, whereby either may be adjusted into and out of operative relation.

6. In combination, a vehicle driven distance train, and a motor driven and vehicle released time train, comprising respectively distance and charge indicators and totalizers and controlling mechanism coöperating with both said trains, whereby they may be adjusted into or out of operative position, as specified.

7. In combination, a vehicle driven distance train and a motor driven and vehicle released time train comprising respectively charge indicators and totalizers and interlocking controlling mechanisms coöperating with both the trains whereby the trains are rendered separately adjustable into or out of operative position, as specified.

8. In combination, a vehicle driven distance train and a motor driven and vehicle released time train, comprising respectively distance and charge indicators and totalizers, independent controlling mechanism for adjusting each train into or out of operative position and a locking device common to both controlling mechanisms, whereby said trains are limited to operate singly, as specified.

9. In combination, a vehicle driven distance train and a vehicle released and motor driven time train, comprising respectively distance and charge indicators and totalizers, intermittently operating driving gear connecting the several devices of each train with their source of power and intermediate controlling mechanisms coöperating with both trains for separately adjusting the trains for operation, as specified.

10. The combination with a vehicle driven shaft, of a distance train operatively connected with the shaft and comprising indicators and totalizers, a vehicle released time train comprising distance and charge indicators and totalizers, a time train motor operatively connected with the vehicle driven shaft and mechanism coöperating with both trains controlling the adjustment of the trains into or out of operative position, as specified.

11. The combination with a vehicle driven shaft, of a distance train operatively connected with the shaft and indicators and totalizers, a vehicle released time train comprising distance and charge indicators and totalizers, a time train motor, a locking device interposed between the motor and vehicle driven shaft and mechanism coöperating with both trains controlling the adjustment of the trains into or out of operative position, as specified.

12. The combination with a vehicle driven shaft, of distance and time trains, driving gear therefor, impulse ratchet mechanisms operatively connected with the driving gear of each train, clutches interposed between the trains and the vehicle driven shaft, and means controlling the ratchet mechanisms and clutches, whereby the trains may both be set separately for effective operation, in totalizing the charge.

13. The combination with a vehicle driven shaft, of distance and time trains, a system of locking pawls for each train, clutches connecting the trains with the driven shaft, and mechanism controlling the adjustment of the locking pawls and clutches, whereby the trains may be separately set for operation, as specified.

14. The combination with a vehicle driven shaft, of distance and time trains, a system of locking pawls for each train, clutches connecting the trains with the driven shaft, and interlocking mechanisms controlling the adjustment of the pawls and clutches, whereby the trains are limited to operate singly, as specified.

15. The combination with a vehicle driven shaft, of a distance train clutch connected with and driven by the shaft, a motor driven time train, a train locking device interposed between the shaft and time train, means carried by the shaft for actuating the locking device, and mechanism controlling the adjustment of the trains in or out of operation, as specified.

16. The combination with a vehicle driven shaft, of a distance train clutch connected and driven by the shaft, a motor driven time train, an automatic train locking device interposed between the shaft and time train, disengaging means carried by the shaft for actuating the locking device, whereby the time train is vehicle released, and controlling mechanism for separately adjusting the trains for operation, as specified.

17. The combination with a vehicle driven shaft, of a distance train and a motor driven time train, each operatively connected with said shaft, automatic locking devices interposed between the trains and the shaft, disengaging means carried by the shaft for actuating the locking devices, and controlling mechanism for separately adjusting the trains for operation, as specified.

18. The combination with a vehicle driven shaft, of distance and time trains, driving gear therefor, automatic train locking devices interposed between said shaft and driving gear and disengaging means carried by the shaft, whereby the trains are vehicle released, as specified.

19. The combination with a vehicle driven shaft, of distance and time trains, intermittently operating driving gear therefor, automatic train locking devices interposed between said shaft and driving gear and disengaging means carried by the shaft, whereby the trains are vehicle released, as specified.

20. The combination with a vehicle driven shaft, of distance and time trains, impulse ratchet mechanism for each train, automatic train locking devices interposed between said shaft and the ratchet mechanisms, disengaging means carried by the shaft whereby the trains are vehicle released, and levers controlling the adjustment of each train in and out of operation, as specified.

21. In combination, a vehicle driven shaft, distance and time trains, clutches operatively connecting the trains with the shaft, automatic train locking devices, and disengaging means carried by the clutches for actuating the locking devices, as specified.

22. The combination with a vehicle driven shaft, of a cyclometer mounted thereon, distance and time trains, clutches operatively connecting the trains with the shaft, automatic train locking devices, and disengaging means carried by the clutches for actuating the locking devices, as specified.

23. In combination, a vehicle driven cyclometer shaft, distance and time trains, clutches operatively connecting the trains with the shaft, automatic train locking devices, disengaging means carried by the clutches for actuating the locking devices and means controlling the adjustment of the clutches, as specified.

24. The combination with a register, of vehicle driven ratchet mechanism operatively connected to effect indications by the register, said mechanism being manually set for operation and vehicle released, and means for automatically adjusting the same to vary the indications, as specified.

25. The combination with a register, of ratchet mechanism operatively connected to periodically effect indications by the register, said mechanism comprising main and auxiliary ratchets and pawls and means for automatically adjusting the same relatively to effect temporary disengagement of the main pawl and ratchet, as specified.

26. The combination with a register, of impulse ratchet mechanism, comprising a main ratchet operatively connected with the register gearing, an oscillating pawl coöperating with the main ratchet, a spring retracted auxiliary ratchet having a limited rotation under the influence of the oscillating pawl and provided with teeth of varying depth, a locking pawl and means for automatically adjusting the locking pawl relatively to the auxiliary ratchet, as described.

27. Impulse ratchet mechanism, comprising a main ratchet and a spring retracted auxiliary ratchet rotatable in one direction and provided with teeth of varying depth, an oscillating pawl common to the ratchets, a locking pawl coöperating with the auxiliary ratchet and means for adjusting the locking pawl relatively to the auxiliary ratchet, as specified.

28. The combination with a driving shaft, of impulse mechanism comprising a main ratchet, an auxiliary ratchet rotatable in one direction and provided with teeth of varying depth, an oscillating pawl manually adjustable and common to the ratchets, a pawl locking device, an auxiliary pawl coöperating with the auxiliary ratchet and disengaging means carried by the shaft for actuating the pawl locking device and the auxiliary locking pawl, as specified.

29. A registering train, comprising trip and permanent registers connected through intermeshing gearing, continuously acting pawls limiting the permanent registers to rotation in one direction, a system of locking pawls coöperating with the trip registers, a clutch interposed between the permanent and trip registers, means for reversing the trip registers and an adjusting lever controlling the locking pawls, clutch and reversing means, as specified.

30. In a taximeter, a register normally in non-indicating position and covered by a shutter, an actuating mechanism therefor connected with a vehicle, manually operated means for setting said actuating mechanism into or out of operative position to actuate said register and for simultaneously moving the shutter, and automatic means for releasing said actuating mechanism to cause the initial indication upon the register dependent upon a predetermined movement of the vehicle.

31. In a taximeter, a plurality of registers and operating mechanisms, shutters for said registers, means for removing either one of said shutters and uncovering its register, and simultaneously locking the other shutters and locking the other mechanisms, said means being operative for said single-izing movements, only, prior to the movements of the operating mechanisms.

32. In a taximeter, a plurality of registers, actuating mechanisms therefor, means whereby any of said registers may be set into or out of operative position, releasing means for the actuating mechanism connected with the vehicle and dependent for operation upon a movement of said vehicle, and means for locking one of the register setting mechanisms upon a movement of the releasing mechanism.

33. In a fare indicator for vehicles, the combination of a fare indicating device, means for automatically actuating said indicating device, and automatically operated means controlled by the actuating means for said indicator for affording a movement of the indicating device to display an amount in advance of the time such amount is earned by the vehicle.

34. In a fare-register, counting or indicating mechanism, chronometer and cyclometer mechanisms, means for placing said mechanisms in condition for operation, consisting of a revoluble shaft in gear with said mechanisms, and means for turning said shaft, a stop on said shaft and means under control of the passenger, coacting with said stop, to prevent a premature operation of said shaft by the driver.

35. In a fare-register, chronometer and cyclometer mechanisms, registering mechanism operated by said mechanisms, a shaft driven by said chronometer mechanism, means for driving the registering mechanism free to be moved laterally on said shaft into a one-way-clutching engagement therewith, means driven by the cyclometer mechanism, free to be moved laterally, with a one-way clutching engagement with register driving means.

36. In a fare-register, chronometer and cyclometer mechanisms, registering mechanism operated by said mechanisms, a shaft driven by said chronometer mechanism, means for driving the registering mechanism free to be moved laterally on said shaft into a clutching engagement therewith, means driven by the cyclometer mechanism, free to be moved laterally on a shaft, with a clutching engagement with said register driving means, and setting means for throwing register driving means into its engagement with the shaft, and said cyclometer driven means into its engagement with the register driving means.

37. In a fare-register, chronometer and cyclometer mechanisms, registering mechanism, arranged when set to be operated by said mechanisms, cam mechanism controlled by the operator for setting the registering mechanism into an operative relation to the chronometer and cyclometer mechanism, and for simultaneously resetting the register to efface the indication of the previous service.

38. In a fare-register, indicating means adapted to increase its rate of indication, means for resetting said indicating means, means for actuating said indicating means during service of the vehicle and means for placing said indicating and said actuating means in operative condition after the indicating means has been reset to effect the minimum-charge indication.

39. In a fare-register, indicating means adapted to increase its rate of indication, means for resetting said indicating means to effect a minimum-charge indication, means for actuating said indicating means during service of the vehicle, means for placing said indicating and said actuating means in operative relation to each other after the indicating means has been reset for the minimum-charge indication, and means to defer for a predetermined time the action of the actuating means upon the indicating means when said indicating and actuating means are so placed in operative relation to each other.

40. In a fare-register for vehicles, indicating mechanism, cyclometer and chronometer mechanism, means for driving said indicating mechanism, said driving means being arranged to be moved to be placed in operative relation to the cyclometer and chronometer mechanism.

41. In a fare register, indicating means, means comprising chronometer or cyclometer mechanism for intermittently operating to increase the rate of indication at the beginning and thereafter uniform movements, said indicating means being located readily visible by the occupant of the vehicle, means for illuminating the face of said fare indicating means.

42. In a taximeter, a casing, charge indicators in said casing mechanism, an aperture in said casing to permit the view of said indicators, minimum charge indicating mechanism, mileage registration mechanism in said casing, indicators for said mileage mechanism, resetting means in said casing and means projecting from said casing for actuating said resetting means.

Signed my be at New York, N. Y., this 5th day of July, 1899.

JAMES ALEXANDER KEYES.

Witnesses:
E. H. PILSBURY,
FRANKLAND JANNUS.